(12) United States Patent
Hirose et al.

(10) Patent No.: US 9,444,396 B2
(45) Date of Patent: Sep. 13, 2016

(54) SOLAR PHOTOVOLTAIC POWER GENERATION PANEL MOUNT

(71) Applicant: Sunrail Co., Ltd., Gifu (JP)

(72) Inventors: Norio Hirose, Gifu (JP); Fumio Katoh, Gifu (JP)

(73) Assignee: Sunrail Co., Ltd., Gifu (JP)

( * ) Notice: Subject to any disclaimer, the term of this patent is extended or adjusted under 35 U.S.C. 154(b) by 0 days.

(21) Appl. No.: 14/571,698

(22) Filed: Dec. 16, 2014

(65) Prior Publication Data

US 2016/0173022 A1 Jun. 16, 2016

(51) Int. Cl.
*F24J 2/52* (2006.01)
*H01L 31/042* (2014.01)
*H02S 20/10* (2014.01)
*H02S 20/23* (2014.01)

(52) U.S. Cl.
CPC .............. *H02S 20/10* (2014.12); *H02S 20/23* (2014.12); *F24J 2/5232* (2013.01); *Y02E 10/47* (2013.01)

(58) Field of Classification Search
None
See application file for complete search history.

(56) References Cited

U.S. PATENT DOCUMENTS

| | | | | |
|---|---|---|---|---|
| 5,125,608 A * | 6/1992 | McMaster | ............... | F24J 2/5232 126/570 |
| 8,181,419 B1 * | 5/2012 | diGirolamo | ............. | E04B 2/768 248/909 |
| 2003/0034029 A1 * | 2/2003 | Shingleton | ............. | F24J 2/5232 126/600 |
| 2010/0132769 A1 * | 6/2010 | Potter | ..................... | E04H 6/025 136/251 |
| 2010/0275975 A1 * | 11/2010 | Monschke | ............. | F24J 2/5207 136/251 |
| 2010/0319277 A1 * | 12/2010 | Suarez | ..................... | F24J 2/523 52/173.3 |
| 2011/0024582 A1 * | 2/2011 | Gies | ........................ | F24J 2/5239 248/122.1 |
| 2011/0068244 A1 * | 3/2011 | Hartelius | ............... | F24J 2/5232 248/298.1 |
| 2011/0214365 A1 * | 9/2011 | Aftanas | .................. | F24J 2/5258 52/173.3 |
| 2011/0272367 A1 * | 11/2011 | Kufner | ................... | F24J 2/5232 211/41.1 |
| 2011/0290305 A1 * | 12/2011 | Hoffmann | ............. | F24J 2/5205 136/251 |

(Continued)

FOREIGN PATENT DOCUMENTS

JP 3171824 U 11/2011
JP 2011220096 A 11/2011

*Primary Examiner* — Joshua J Michener
*Assistant Examiner* — Kyle Walraed-Sullivan
(74) *Attorney, Agent, or Firm* — St. Onge Steward Johnson & Reens LLC

(57) ABSTRACT

A solar photovoltaic power generation panel mount has a solar photovoltaic power generation panel attached to a mount frame having a plurality of vertical and horizontal bars connected in a grid-like manner. Concrete foundations project upwardly from a mount installation surface at predetermined intervals in a right-left direction under front and rear sides of the mount frame, and the mount frame is supported by the concrete foundations so as to be positionally adjustable in the up-down and right-left directions by mounting brackets fastened to a top of each of the concrete foundations.

11 Claims, 14 Drawing Sheets

(56) References Cited

U.S. PATENT DOCUMENTS

| | | | |
|---|---|---|---|
| 2012/0006317 A1* | 1/2012 | Sade | F24J 2/5413 126/600 |
| 2012/0017526 A1* | 1/2012 | Eide | F24J 2/5207 52/173.3 |
| 2012/0048351 A1* | 3/2012 | Rizzo | F24J 2/5239 136/251 |
| 2012/0124922 A1* | 5/2012 | Cusson | E04H 1/1205 52/173.3 |
| 2012/0132262 A1* | 5/2012 | Sagayama | H02S 20/00 136/251 |
| 2012/0223033 A1* | 9/2012 | Molek | F16B 7/18 211/41.1 |
| 2012/0267328 A1* | 10/2012 | McPheeters | F24J 2/5233 211/41.1 |
| 2012/0273031 A1* | 11/2012 | Sagayama | F24J 2/5233 136/251 |
| 2012/0312357 A1* | 12/2012 | Sagayama | F24J 2/523 136/251 |
| 2013/0092215 A1* | 4/2013 | Schroeder | F24J 2/5232 136/251 |
| 2013/0146554 A1* | 6/2013 | Berry | H01L 31/0422 211/175 |
| 2013/0167907 A1* | 7/2013 | Bitarchas | H02S 20/00 136/251 |
| 2013/0291472 A1* | 11/2013 | Sader | F24J 2/5205 52/543 |
| 2014/0069483 A1* | 3/2014 | Wolter | H01L 31/0422 136/246 |
| 2014/0215953 A1* | 8/2014 | Sawaki | F24J 2/5232 52/653.1 |
| 2014/0224751 A1* | 8/2014 | Sawaki | F24J 2/525 211/41.1 |
| 2015/0034575 A1* | 2/2015 | Warpup | H02S 20/10 211/41.1 |
| 2015/0122333 A1* | 5/2015 | Kitano | H02S 20/10 136/259 |

\* cited by examiner

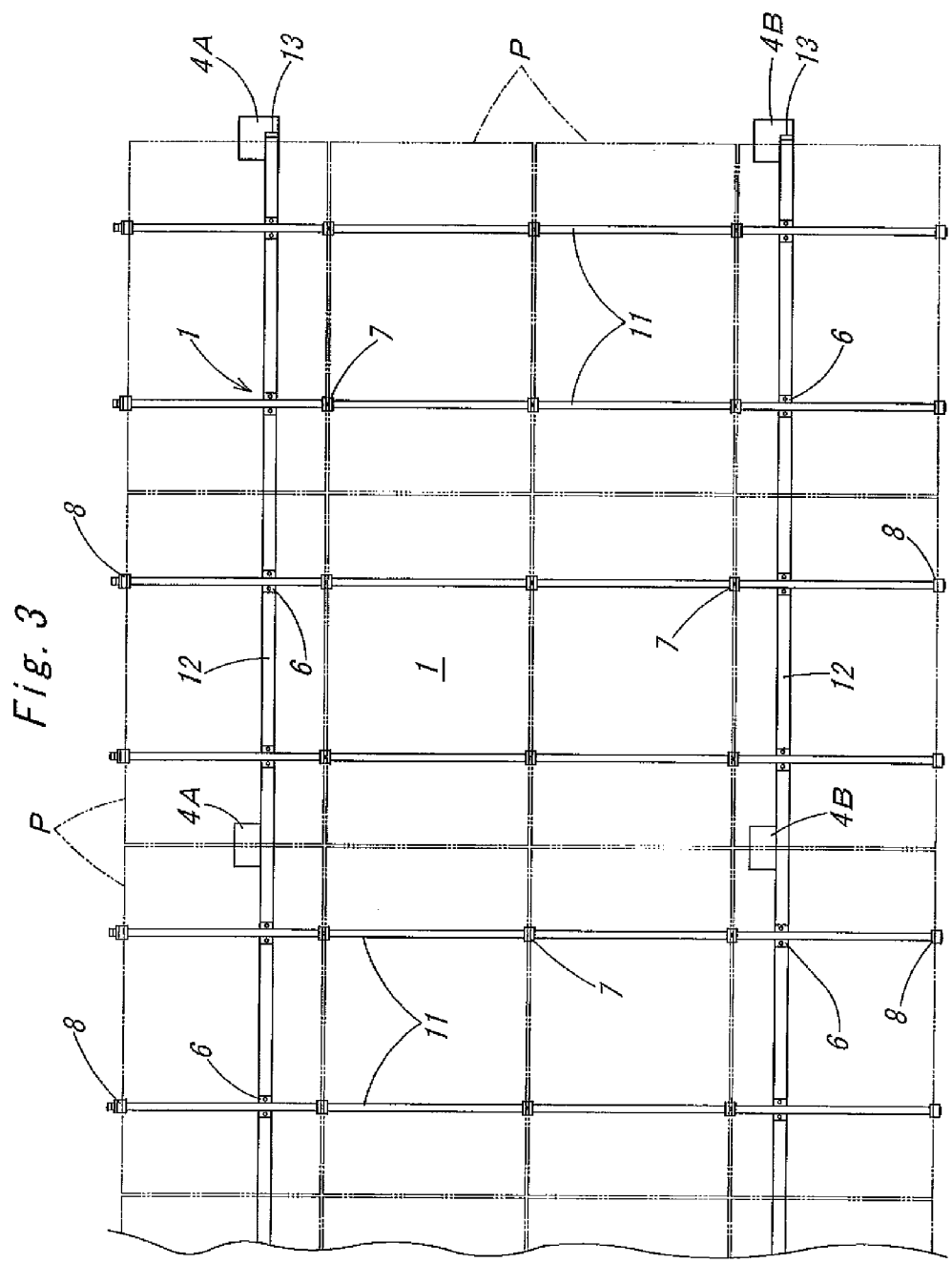

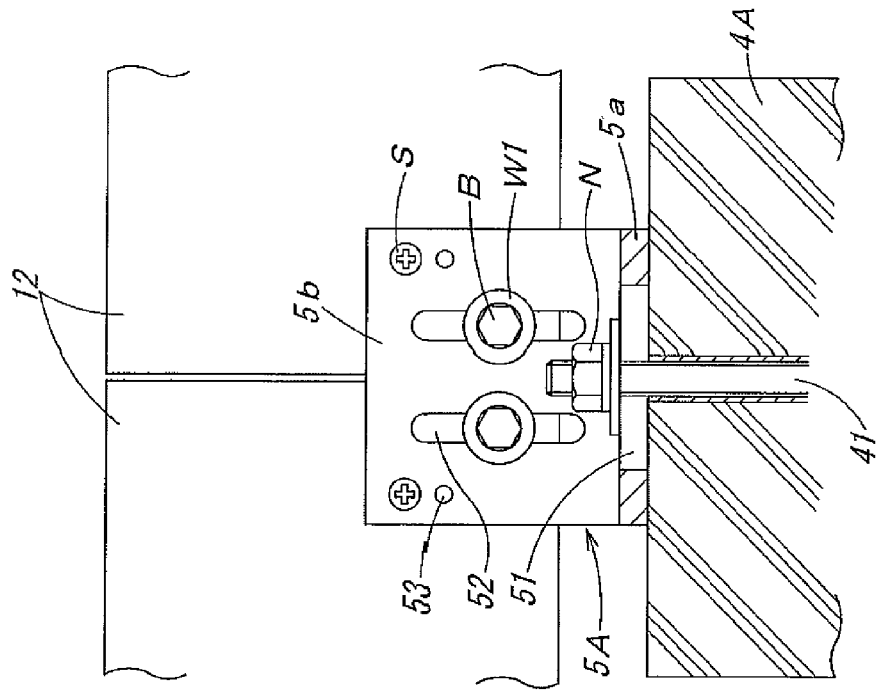
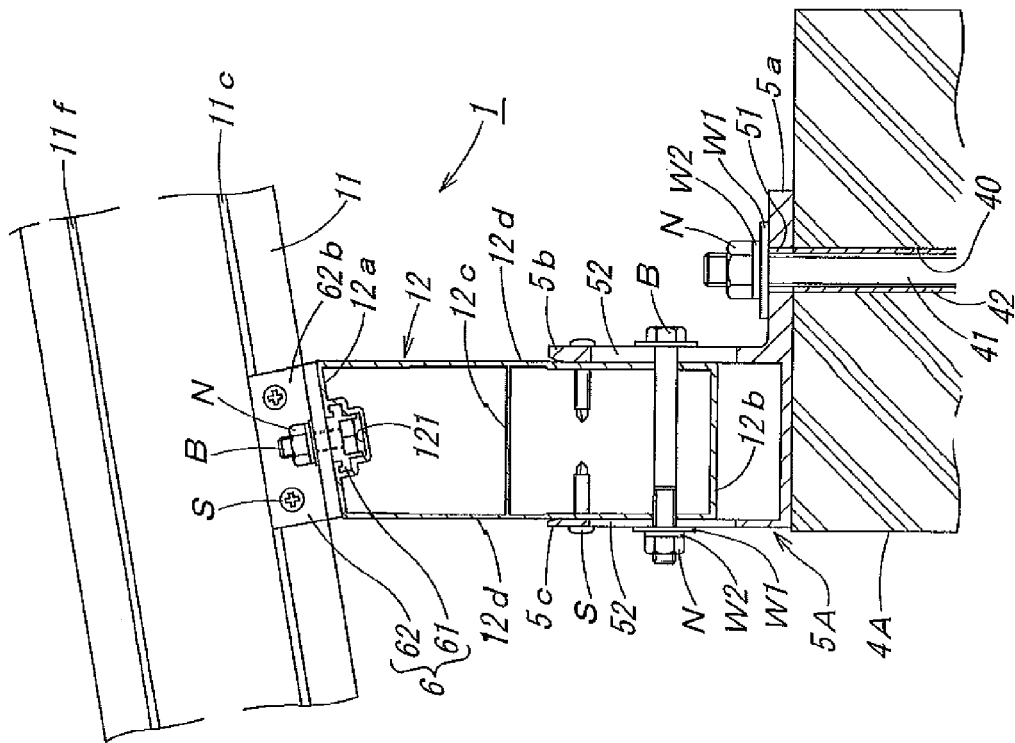
Fig. 4A
Fig. 4B

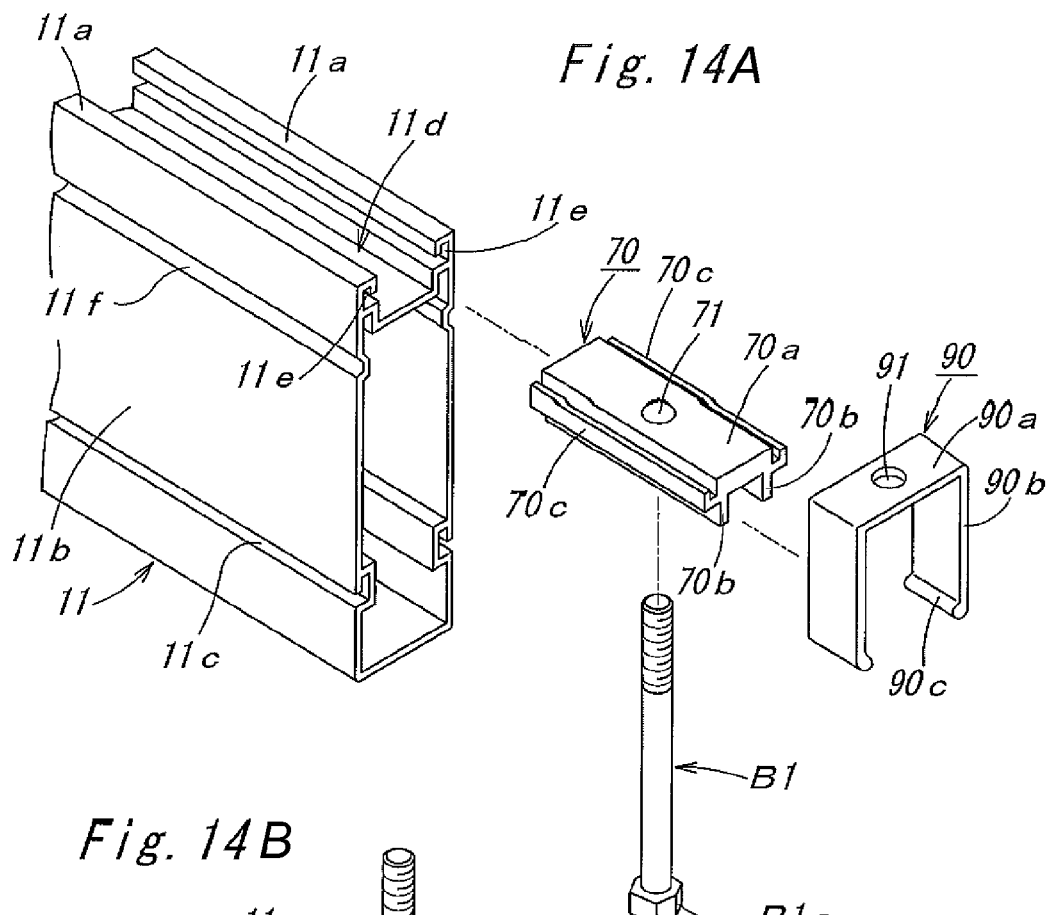
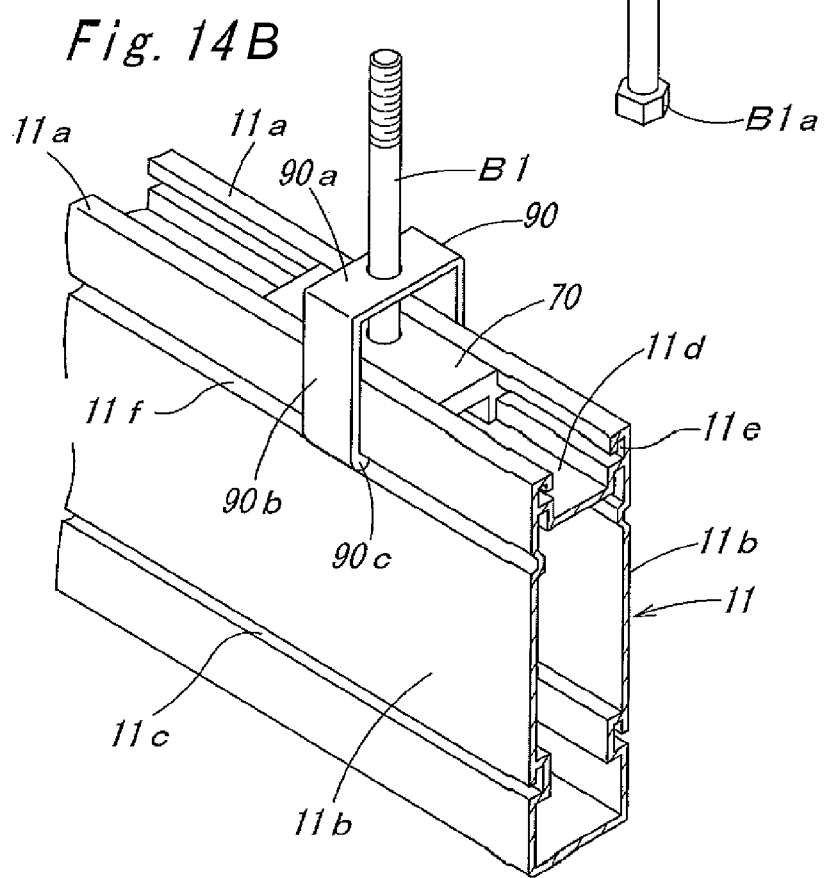

SOLAR PHOTOVOLTAIC POWER GENERATION PANEL MOUNT

FIELD OF THE INVENTION

The present invention relates to a solar photovoltaic power generation panel mount in which a solar photovoltaic power generation panel is installed on a mount frame having a plurality of vertical and horizontal bars connected together in a grid-like manner.

BACKGROUND OF THE INVENTION

In recent years, from the viewpoints of environmental protection, resource saving, $CO_2$ reduction, etc., large-scale solar photovoltaic power generation facilities have spread which are called a "mega solar" or a "giga solar" and in which many solar battery arrays are arranged side by side on the ground including flat land and inclined land or on a deck such as the roof of a building. However, generally, a solar battery array, which is formed by arranging a plurality of solar photovoltaic power generation panels (solar battery modules) in a flat manner so as to have its short side of several meters and its long side of from several meters to several tens of meters, is great in size and in weight, and is liable to receive wind pressure by being disposed at a predetermined inclination angle in consideration of light-receiving efficiency, and is susceptible to earthquake shocks, and therefore this solar battery array is required to have great structural strength, and is required to cope with ground surface irregularity when it is installed on the ground or to cope with uneven ground settlement after it is installed on the ground, and is required to achieve installing-operation facilitation, cost reductions, etc.

According to a conventional method, a mount that is made of, for example, shaped steel having a specific shape in cross section and on which solar photovoltaic power generation panels are placed is constructed while using concrete stakes or foundations as bases, and this conventional method has been heavily employed as a means for installing the solar battery array on the ground or on a deck. Typical structures of this mount include a structure (For example, Japanese Published Unexamined Patent Application No. 2011-220096 (FIG. 1, FIG. 42, FIG. 43)) in which a plurality of support pillars are spaced and erected along a longitudinal direction (right-left direction) of the solar battery array, and an upper end of each support pillar is connected to an intermediate position of a vertical bar along a forwardly/rearwardly inclined direction of a mount frame that supports solar photovoltaic power generation panels, and an inclined arm is connected to a position between a barrel part of each support pillar and a front side of or both front and rear sides of each vertical bar and a structure (For example, Japanese Registered Utility Model No. 3171824 (FIG. 1)) in which a mount frame that supports solar photovoltaic power generation panels is supported by support pillars arranged on the front/rear and right/left sides, and diagonal and horizontal reinforcing bars are connected together between the front/rear adjoining support pillars and between the right/left adjoining support pillars.

SUMMARY OF THE INVENTION

The invention relates to a solar photovoltaic power generation panel mount that is particularly suitable for a large-scale solar photovoltaic power generation facility, such as a mega solar facility (and other uses), and that is placed on support pillars on the ground including flat land and inclined land, or on a deck such as the roof of a building, or another such base.

In a structure in which an upper end of each support pillar is connected to an intermediate position of a vertical bar of a mount frame as in the former patent literature, the solar battery array in the direction of its short side is arranged to be supported by one support pillar, and therefore, disadvantageously, the support pillar has been required to be greatly thickened from the viewpoint of load resistance, and, constructionally, this structure has been easily effected by the shock of an earthquake, and has had difficulty in securing sufficient wind-pressure-resistance strength at a place easily beaten by a strong wind because of, for example, a landform, and has had strict restrictions on an installation place. On the other hand, in a structure in which a mount frame is supported by support pillars arranged on the front/rear sides and the left/right sides as in the latter patent literature, although the weight load of a rectangular unit of a solar battery array is dispersed to four front, rear, left, and right support pillars, and although the support pillars are connected together by means of reinforcing bars so that the structure serves as a mount structure having greater strength, when many solar battery arrays are flatly arranged on a wide site so as to have an enlarged structure serving as a mega solar or as a giga solar, a great laborious effort and time are required to make the heights of those many support pillars placed on the front and rear sides uniform because of the irregular ruggedness of an installation surface in a placing foundation or because of variation in burying depth in a pile foundation, and therefore construction costs become higher correspondingly, and, even if high constructional accuracy is achieved, there will be many cases in which some of the support pillars reach a floating state because of the uneven settlement of the ground after having undergone construction operations or because of surface erosion by means of rainwater, and there has been a fear that the solar photovoltaic power generation panels will be damaged by stress concentration when earthquake motion or wind pressure is received.

In consideration of these circumstances, it is an object of the present invention to provide a solar photovoltaic power generation panel mount that is capable of adjusting the heights and the right/leftwise positions of supporting portions of a mount frame on which solar photovoltaic power generation panels are placed with respect to front and rear concrete foundations, that is capable of easily making the heights and positions of many supporting portions uniform even if solar battery arrays are enlarged as a mega solar or as a giga solar and hence capable of obtaining high constructional accuracy, and that is capable of being easily constructed while having excellent earthquake-resistance strength and excellent wind-pressure-resistance strength.

While reference signs of the drawings are respectively given to means for achieving the aforementioned object, one embodiment of a solar photovoltaic power generation panel mount according to the invention is arranged such that solar photovoltaic power generation panels P are attached onto a mount frame 1 that is inclined to become forwardly lower and in which a plurality of vertical bars 11 in a front-rear direction and a plurality of horizontal bars 12 in a right-left direction are connected together in a grid-like manner, and concrete foundations 4A and 4B that project upwardly from a mount installation surface (the ground G) are disposed with a predetermined interval therebetween in the right-left direction under a front side and a rear side of the mount frame 1, and the mount frame 1 is supported and fixed onto these concrete foundations 4A and 4B so as to be positionally adjustable in an up-down direction and in the right-left direction by means of mounting brackets 5A and 5B fastened to tops, respectively, of the concrete foundations 4A and 4B.

Another embodiment of the invention is arranged such that in the solar photovoltaic power generation panel mounts as described above, the mounting brackets 5A and 5B each include a horizontal plate portion 5a having a long hole 51 in the right-left direction and vertical wall portions 5b and 5c having long holes 52 in an up-down direction as shown in FIG. 4A and FIG. 4B, and, in the horizontal plate portion 5a, an anchor bolt 41 that protrudes from a top surface of each of the concrete foundations 4A and 4B is passed through the long hole 51 and is tightened and fastened with a nut N, and, in the vertical wall portions 5b and 5c, a nut N is tightened and fastened to an attachment bolt B passing through a supporting portion (horizontal bar 12, support pillar 2) on a side of the mount frame 1 through the long hole 52.

Another embodiment of the invention is arranged such that, in the solar photovoltaic power generation panel mounts described above, the horizontal bar 12 of the mount frame 1 is set to have a length corresponding to a distance between adjoining support pillars 2 and 2, and, as shown in FIG. 5, an end of each horizontal bar 12 is connected to an upper-end lateral half part of the support pillar 2, and, as shown in FIG. 7A, FIG. 7B, and FIG. 8, a yardarm member 13 that has the same longitudinal sectional shape as the horizontal bar 12 is fastened to an upper-end lateral half part not connected to the horizontal bar in the support pillars 2 positioned at both right and left ends of the mount frame 1.

Another embodiment of invention is characterized in that, in the solar photovoltaic power generation panel mounts described above, as shown in FIG. 4A and FIG. 6, a backwardly-wide sliding guide groove 121 that is continuous in the longitudinal direction is formed in an upper surface of a horizontal bar 12 of the mount frame 1, and a frame connection metal fitting 6 is fitted to the sliding guide groove 121 so as to be slidable and so as to be upwardly inseparable, and, on the other hand, an engagement groove 11c continuous in the longitudinal direction is formed in both sides of the vertical bar 11, and, as shown in FIG. 9 to FIG. 11, the frame connection metal fitting 6 has two parallel sandwiching wall portions 62b that protrude upwardly along a direction perpendicular to a sliding direction with respect to the sliding guide groove 121, and an engagement piece 62c that protrudes inwardly is formed at each of the sandwiching wall portions 62b and 62b, and fixing means (fixing bolt B, nut N, drilling tapping screw S) that fix the frame connection metal fitting 6 to the vertical bar 11 and to the horizontal bar 12 are provided, and both engagement pieces 62c are engaged with both engagement grooves 11c, respectively, and the vertical bar 11 is slid and fitted between both sandwiching wall portions 62b and 62b of the frame connection metal fitting 6 fitted in the sliding guide groove 121, and the frame connection metal fitting 6, the vertical bar 11, and the horizontal bar 12 are fixed together by the fixing means.

Another embodiment of the invention is arranged such that, in the solar photovoltaic power generation panel mounts described above, as shown in FIG. 9 to FIG. 11, the frame connection metal fitting 6 is composed of a slide member 61 that is fitted to the sliding guide groove 121 and a receiving member 62 that has two parallel sandwiching wall portions 62b and that allows the sandwiching wall portions 62b to be disposed on the slide member 61, and the fixing means with respect to the horizontal bar 12 allows both upper edge portions 12a and 12a of the sliding guide groove 121 sandwiched between the slide member 61 and the receiving member 62 to be sandwiched by screwing and tightening a nut N to a fixing bolt B passing through the slide member 61 and through the receiving member 62.

Another embodiment of the invention of is arranged such that, in the solar photovoltaic power generation panel mounts described above, as shown in FIG. 9 to FIG. 11, the fixing bolt B passes through the board portion 62a of the receiving member 62 and the slide member 61 from below at positions outside both sandwiching wall portions 62b and 62b of the receiving member 62, and a concave portion 61c in which a head of the fixing bolt B is contained is formed in a lower surface of the slide member 61.

Another embodiment of the invention is arranged such that, in the solar photovoltaic power generation panel mounts described above, as shown in FIG. 12 to FIG. 14, a backwardly-wide sliding guide groove 11d that is continuous in the longitudinal direction is formed in an upper surface of the vertical bar 11 of the mount frame 1, and a slide metal fitting 70 made of a cut short member of an aluminum extrusion molding material is fitted to the sliding guide groove 11d so as to be slidable and so as to be upwardly inseparable, and a fastening bolt B1 that has been passed through the slide metal fitting 70 from below protrudes upwardly, and the solar photovoltaic power generation panels P and P placed on the vertical bar 11 of the mount frame 1 are allowed to adjoin each other with the fastening bolt B1 therebetween, and a presser metal fitting 80 fitted to the fastening bolt B1 is extended between rectangular frame bodies Pf and Pf of the adjoining solar photovoltaic power generation panels P and P, and both the solar photovoltaic power generation panels P and P are firmly sandwiched between the presser metal fitting 80 and the vertical bar 11 by tightening a nut N1 that has been screwed to the fastening bolt B1 from above the presser metal fitting 80.

Another embodiment of the invention is arranged such that, in the solar photovoltaic power generation panel mounts described above, as shown in FIG. 14A and FIG. 14B, the slide metal fitting 70 has parallel two leg pieces 70b and 70b erected on a lower surface side of a board portion 70a that has a bolt through-hole 71 and that is formed in a band-plate shape long in the sliding direction, and a head B1a of the fastening bolt B1 passing through the bolt through-hole 71 is contained non-rotationally between both the leg pieces 70b and 70b.

Another embodiment of the invention is arranged such that, in the solar photovoltaic power generation panel mounts described above, as shown in FIG. 14A and FIG. 14B, the vertical bar 11 is made of a hollow aluminum extrusion molding material, and the sliding guide groove 11d is formed so as to be backwardly wide by engagement groove portions 11e and 11e concaved in inner surfaces of both sides, and engagement strip portions 70c and 70c that engage the engagement groove portions 11e and 11e, respectively, are erected on both sides in a width direction of the board portion 70a of the slide metal fitting 70.

Another embodiment of the invention is arranged such that, in the solar photovoltaic power generation panel mounts described above, as shown in FIG. 12, a spacer metal fitting 90 is fitted to the fastening bolt B1 so as to be lower than the presser metal fitting 80, and positioning is performed by allowing the spacer metal fitting 90 to be sandwiched between the adjoining solar photovoltaic power generation panels P and P.

Another embodiment of the invention is arranged such that, in the solar photovoltaic power generation panel mounts described above, as shown in FIG. 14A and FIG. 14B, an engagement groove 11*f* continuous in the longitudinal direction is formed in both sides of the vertical bar 11, and the spacer metal fitting 90 is made of a cut short member of an aluminum extrusion molding material that has a frame shape of an angular "U" opened downwardly, and an engagement convex portion 90*c* that protrudes inwardly is formed on each of both side pieces 90*b* and 90*b*, and both engagement convex portions 90*c* and 90*c* are engaged with both engagement grooves 11*f* and 11*f*, respectively, and are slid and fitted to the vertical bar 11 upwardly-inseparably.

Another embodiment of the invention is arranged such that, in the solar photovoltaic power generation panel mounts described above, as shown in FIG. 12 and FIG. 16, a stopper member 110 that prevents the slide metal fitting 70 fitted in the sliding guide groove 11*d* from falling off is fastened to a front end of the sliding guide groove 11*d* of the vertical bar 11 inclined so as to become forwardly lower.

Another embodiment of the invention is arranged such that, in the solar photovoltaic power generation panel mounts described above, as shown in FIG. 12 and FIG. 16, in ends of the vertical bar 11, an end presser metal fitting 100 with respect to the rectangular frame body Pf of the solar photovoltaic power generation panel P placed at an end position is fitted to the fastening bolt B1 passing through the slide metal fitting 70 fitted to the sliding guide groove 11*d*, and a nut N1 that has been screwed to the fastening bolt B1 is tightened from above the end presser metal fitting 100, and, as a result, the solar photovoltaic power generation panel P at the end position is firmly sandwiched between the end presser metal fitting 100 and the vertical bar 11, and the fastening bolt B1 is laterally covered with a lateral cover portion 101 contiguous to the end presser metal fitting 100.

Next, effects of the invention will be described while using reference signs of the drawings. First, according to the solar photovoltaic power generation panel mount according to a first embodiment of the invention, the mount frame 1 on which solar photovoltaic power generation panels P are placed is supported and fixed to the concrete foundations 4A and 4B, which are spaced with a predetermined interval therebetween in the right-left direction thereunder on the front and rear sides, by means of the mounting brackets 5A and 5B, and their supporting portions are positionally adjustable by means of the mounting brackets 5A and 5B in the up-down and right-left directions, and therefore, even if the solar battery array is enlarged as a mega solar or as a giga solar, it is possible to easily make the heights and positions of these many supporting portions uniform, and it is possible to obtain high constructional accuracy. Additionally, even if some of the concrete foundations 4A and 4B reach a floating state because of the uneven settlement of the ground after having undergone construction operations or because of surface erosion by means of rainwater etc., it will be possible to beforehand avoid damage to the solar photovoltaic power generation panels caused by stress concentration when earthquake movement or wind pressure is received by readjusting the upper and lower positions of the supporting portions so as to return to a state in which a normal load is applied.

According to the solar photovoltaic power generation panel mount according to a second embodiment of the invention, in the mounting brackets 5A and 5B, the anchor bolt 41 that protrudes from its top surface is tightened and fastened to the concrete foundations 4A and 4B by means of the nut N through the long hole 51 of the horizontal plate portion 5*a*, and the attachment bolt B is passed through the long hole 52 of the vertical wall portions 5*b* and 5*c* and is tightened and fastened to supporting portions (horizontal bar 12, support pillar 2) on the side of the mount frame 1 by means of the nut N, and therefore positional adjustments in the up-down and left-right directions are reliably made to the supporting portions by an extremely simple structure.

According to the solar photovoltaic power generation panel mount according to a third embodiment of the invention, the horizontal bar 12 of the mount frame 1 is arranged so that an end of each horizontal bar 12 is connected to an upper-end lateral half part of the support pillar 2 as shown in FIG. 5 as a length corresponding to the distance between the adjoining support pillars 2 and 2, and, as a result, it is possible to use it as a horizontal bar 12 in such a manner as to add a bar having the same length even if the mount frame 1 is greatly enlarged, and it is possible to enjoy an advantage produced by sharing in members and in operations, and, although an upper-end lateral half part of the support pillar 2 becomes a part not connected to the horizontal bar at both right and left end positions of the mount frame 1, a yardarm member 13 having the same longitudinal sectional shape as the horizontal bar 12 is fastened to the part not connected to the horizontal bar as shown in FIG. 7 and FIG. 8 to prevent a lowering of external appearance. Additionally, it is possible to improve the visual quality at the ends by attaching a covering material 14 with which the end surface is covered to the yardarm member 13.

According to the solar photovoltaic power generation panel mount according to a fourth embodiment of the invention, as shown in FIG. 4A and FIG. 6, the frame connection metal fitting 6 is fitted to the sliding guide groove 121 formed in the upper surface of the horizontal bar 12 so as to be slidable and so as to be upwardly inseparable in each intersection portion between the vertical bar 11 and the horizontal bar 12 of the mount frame 1, and, as shown also in FIG. 9 to FIG. 11, the upper-side bar is slid and fitted to a space between both sandwiching wall portions 62*b* and 62*b* protruding upwardly of the frame connection metal fitting 6 in such a way that the engagement piece 62*c* of the sandwiching wall portion 62*b* engages each engagement groove 11*c* on both sides of the vertical bar 11, and then the frame connection metal fitting 6, the vertical bar 11, and the horizontal bar 12 are fixed by fixing means. Therefore, in a temporarily assembled state in which the frame connection metal fitting 6 of each intersection portion has not yet been fixed to both bars, it is possible to arbitrarily perform positional adjustment in the longitudinal direction of the horizontal bar 12 by the movement of the frame connection metal fitting 6 along the sliding guide groove 121, whereas it is possible to arbitrarily perform positional adjustment in the longitudinal direction of the vertical bar 11 by the movement of the vertical bar 11 between both sandwiching wall portions 62*b* and 62*b* of the frame connection metal fitting 6, and therefore the intersection portions of the whole of the mount frame 1 are accurately positioned, and then the frame connection metal fitting 6 of each intersection portion is fixed to both the bars, thus making it possible to efficiently construct the mount frame 1 with high dimensional accuracy without requiring a frequent positional correction. Even if the position and the number of the intersection portions vary in accordance with differences in size and in aspect ratio among the solar photovoltaic power generation panels P to be used, no limitations are imposed on the range of positional adjustments in the up-down and left-right directions in each intersection portion, and the number of frame connection metal fittings 6 to be fitted to the sliding guide groove 121 of the horizontal bar 12 can be arbitrarily set, and therefore it is possible to perform operations utterly without trouble.

According to the solar photovoltaic power generation panel mount according to a fifth embodiment of the invention, as shown in FIG. 9 to FIG. 11, both side edges 12a and 12a of the sliding guide groove 121 of the lower-side bar are sandwiched between both members 61 and 62 by allowing a fixing bolt B to pass through the slide member 61 and the receiving member 62 of the frame connection metal fitting 6 and then screwing and tightening a nut N, and therefore it is possible to fix the frame connection metal fitting 6 to an arbitrary position in the longitudinal direction of the lower-side bar, and a screw hole or a bolt through-hole to fix a connection metal fitting is not required for the horizontal bar 12, and therefore a hole-boring process (usually, which is performed in a construction site) necessary to make those holes is excluded, and construction efficiency is correspondingly improved, and, even if the combination arrangement of the vertical bars 11 and the horizontal bars 12 of the mount frame 1 becomes different, it is possible to share the same lower-side bars, and it is possible to achieve cost reductions by sharing the members.

According to the solar photovoltaic power generation panel mount according to a sixth embodiment of the invention, as shown in FIG. 9 to FIG. 11, the fixing bolt B is passed through the board portion 62a of the receiving member 62 and through the slide member 61 from below, and the head of the fixing bolt B is contained in the concave portion 61c on the lower surface side of the slide member 61 at positions outside both sandwiching wall portions 62b and 62b of the receiving member 62 of the frame connection metal fitting 6, and therefore it is possible to easily temporarily assemble the vertical bars 11 and the horizontal bars 12 without trouble in a not-screwed state or a loosened state of the nut N with respect to the fixing bolt B, and it is possible to fix each connection portion by positionally adjusting each connection portion in the temporarily assembled state and by accurately setting the arrangement of the whole of the mount frame 1 and then tightening the nut N. Additionally, the frame connection metal fitting 6 is tightened and fixed to the lower-side bar at two places, and, a screw is screwed also to the upper-side bar on both sides, and therefore both bars are connected rigidly strongly.

According to the solar photovoltaic power generation panel mount according to a seventh embodiment of the invention, as shown in FIG. 12 to FIG. 14, when a solar photovoltaic power generation panel P is attached to the mount frame 1, the slide metal fitting 70 through which the fastening bolt B1 has passed is fitted into the sliding guide groove 11d of the vertical bar 11 of the mount frame 1 from below, and the solar photovoltaic power generation panels P and P are placed on the vertical bar 11 so that the solar photovoltaic power generation panels P and P adjoin each other with a fastening bolt B1 therebetween, and the presser metal fitting 80 fitted to the fastening bolt B1 is extended between the rectangular frame bodies Pf and Pf of both adjoining solar photovoltaic power generation panels P and P, and a nut N1 is screwed and tightened to the fastening bolt B1 from above the presser metal fitting 80, and, as a result, both solar photovoltaic power generation panels P and P are firmly sandwiched between the presser metal fitting 80 and the vertical bar 11. Therefore, according to this solar photovoltaic power generation panel mount, it is possible to efficiently fix each solar photovoltaic power generation panel P to the mount frame 1 through an easy operation, and its fixing strength is great, and, for example, even if the great shock of an earthquake or the great wind pressure of a strong wind acts on the solar photovoltaic power generation panel P, a load applied to attachment portions with respect to the mount frame 1 is received by both upper edge portions 11a and 11a of the sliding guide groove 11d by means of the slide metal fitting 70, and there is, of course, no fear that the slide metal fitting 70 will be disengaged from the sliding guide groove 11d, and there is no concern that the fastening bolt B1 will be twisted and cut or be bent. Moreover, the slide metal fitting 70 is made of a cut short member of an aluminum extrusion molding material, and therefore, advantageously, it is possible to easily set the slide metal fitting 70 to have great bending strength and a thick form, and it is possible to manufacture many slide metal fittings having the same shape and the same size at low cost from a long aluminum extrusion molding material.

Additionally, in attaching the solar photovoltaic power generation panels P thereto, the slide metal fitting 70 is movable along the sliding guide groove 11d in a not-screwed state or a loosened state of the nut N1 with respect to the fastening bolt B1, and therefore it is possible to positionally adjust each solar photovoltaic power generation panel P placed on the mount frame 1 with ease, and it is possible to set the entire arrangement of the solar photovoltaic power generation panels P with high accuracy by positioning each solar photovoltaic power generation panel P and then screwing and tightening the nut N1. Additionally, the solar photovoltaic power generation panel P is only sandwiched firmly between the presser metal fitting 80 and the vertical bar 11, and therefore the rectangular frame body Pf is not required to have each individual engagement structure, and the height of the presser metal fitting 80 is variable within a range in which a nut N1 is able to be screwed to a fastening bolt B1, and therefore, it is possible to cope with a difference in the up-down thickness of the solar photovoltaic power generation panel P within the variable range, and hence it is possible to obtain high general-purpose properties.

According to the solar photovoltaic power generation panel mount according to an eighth embodiment of the invention, as shown in FIG. 14A and FIG. 14B, the fastening bolt B1 is non-rotationally held in a state in which the slide metal fitting 70 is fitted in the sliding guide groove 11d of the vertical bar 11, and therefore, in installing the solar photovoltaic power generation panels P, it is only necessary to turn a nut N1 when the nut N1 is screwed and tightened to a fastening bolt B1, and an operation is easily performed, and the board portion 70a of the slide metal fitting 70 has a band-plate shape long in the sliding direction, and therefore the contact width of it with respect to both upper edge portions 11a and 11a of the sliding guide groove 11d becomes large, and the fixing strength of the solar photovoltaic power generation panel P is correspondingly increased.

According to a ninth embodiment of the invention, as shown in FIG. 13 and FIG. 14A, the engagement strip portions 70c and 70c erected on both sides in the width direction of the board portion 70a of the slide metal fitting 70 are engaged with the engagement groove portions 11e and 11e concaved on both sides of the sliding guide groove 11d of the vertical bar 11, and therefore the slide metal fitting 70 is prevented from becoming shaky in the sliding guide groove 11d, and the solar photovoltaic power generation panel P reaches a more rigid installed state. Additionally, the vertical bar 11 is made of a hollow aluminum extrusion molding material, and therefore the vertical bar 11 becomes light in weight and becomes high in strength, and, advantageously, even if it has a complex sectional shape having the sliding guide groove 11d, it is possible to massively produce it at low cost.

According to the solar photovoltaic power generation panel mount according to a tenth embodiment of the invention, as shown in FIG. 12, it is possible to sandwich and position the spacer metal fitting 90 fitted to the fastening bolt B1 between the adjoining solar photovoltaic power generation panels P and P, and therefore it is possible to more easily perform the positional setting of each solar photovoltaic power generation panel P on the mount frame 1 with accuracy.

According to the solar photovoltaic power generation panel mount according to an eleventh embodiment of the invention, as shown in FIG. 14A and FIG. 14B, the spacer metal fitting 90 is formed to have the frame shape of an angular "U" opened downwardly, and is slid and fitted to the vertical bar 11 upwardly-inseparably in such a way that the engagement convex portion 90c formed on both side pieces 90b and 90b is engaged with the engagement groove 11f in both sides of the vertical bar 11, and therefore it is possible to slide and fit the spacer metal fitting 90 to the upper-side bar simultaneously with the fitting of the slide metal fitting 70 into the sliding guide groove 11d in a state in which the spacer metal fitting 90 has been beforehand fitted in the fastening bolt B1 passing through the slide metal fitting 70, and an operation is easily performed correspondingly, and the fitted height of the spacer metal fitting 90 in the fastening bolt B1 becomes constant, and the external appearance is improved. Additionally, the spacer metal fitting 90 is made of a cut short member of an aluminum extrusion molding material, and therefore, advantageously, it is possible to manufacture many spacer metal fittings having the same shape and the same size at low cost.

According to the solar photovoltaic power generation panel mount according to a twelfth embodiment of the invention, as shown in FIG. 12 and FIG. 16, the stopper member 110 that prevents the fitted slide metal fitting 70 from falling off is fastened to the front end of the sliding guide groove 11d of the inclined vertical bar 11, and therefore, when solar photovoltaic power generation panels P are attached to the mount frame 1, while each slide metal fitting 70 maintains the not-screwed state or the loosened state of the nut N1 with respect to the fastening bolt B1, it is possible to efficiently arrange the plurality of solar photovoltaic power generation panels P in such a way as to place the solar photovoltaic power generation panels P to be arranged front and rear on the vertical bars 11 with the slide metal fitting 70 at the front end and therebetween successively from the front row side and as to forwardly move the solar photovoltaic power generation panels P in the front-rear direction while sliding the solar photovoltaic power generation panels P along the inclination of the vertical bar 11.

According to the solar photovoltaic power generation panel mount according to a thirteenth embodiment of the invention, as shown in FIG. 12 and FIG. 16, although the solar photovoltaic power generation panel P at its end position is firmly sandwiched between the end presser metal fitting 100 fitted to the fastening bolt B1 passing through the slide metal fitting 70 and the upper-side bar in ends of the upper-side bar, and, as a result, the fastening bolt B1 is laterally covered with the lateral cover portion 101 contiguous to the end presser metal fitting 100, and therefore the external appearance becomes excellent as the entire solar photovoltaic power generation panel mount.

BRIEF DESCRIPTION OF THE DRAWINGS

FIG. 3 is a plan view of the main part of the solar photovoltaic power generation panel mount from which solar photovoltaic power generation panels have been removed.

FIG. 4A and FIG. 4B each show a supporting portion on the front side of the solar photovoltaic power generation panel mount, FIG. 4A being a longitudinal sectional side view, FIG. 4B being a longitudinal sectional front view.

FIG. 14A and FIG. 14B each show a part of the mount frame to which the solar photovoltaic power generation panel is attached, FIG. 14A being a perspective view of members that have not yet been assembled together, FIG. 14B being a perspective view of the members that have been assembled together.

DETAILED DESCRIPTION OF THE INVENTION

Embodiments of a solar photovoltaic power generation panel mount according to the invention will be hereinafter described in detail with reference to the drawings.

Figure 1:
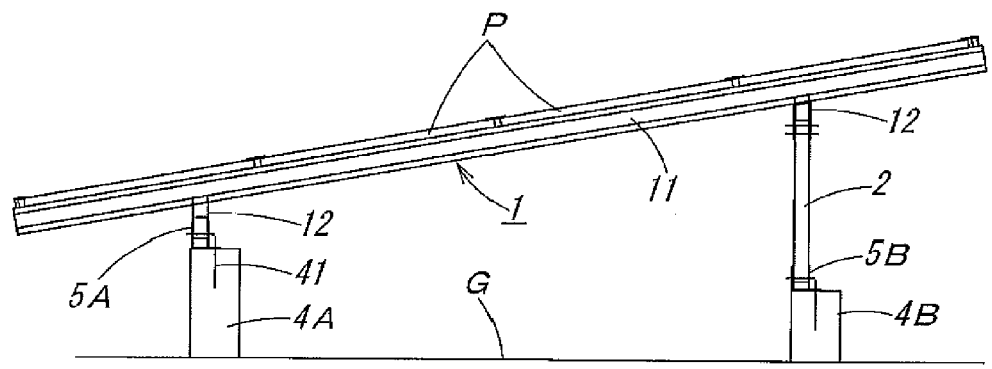
FIG. 1 is a side view of a solar photovoltaic power generation panel mount according to an embodiment of the present invention.
Figure 2:
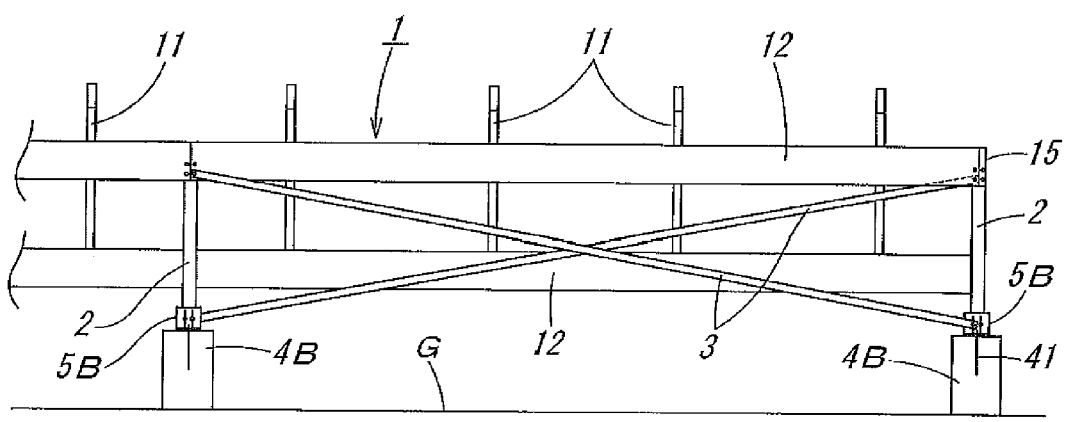
FIG. 2 is a rear view of a main part of the solar photovoltaic power generation panel mount from which solar photovoltaic power generation panels have been removed.

In a solar photovoltaic power generation panel mount shown in FIG. 1 to FIG. 3, a mount frame 1 that is inclined forwardly and downwardly is constructed on prism-shaped concrete foundations 4A and 4B on the front and rear sides, respectively, that are spaced with a predetermined interval therebetween in the right-left direction, and solar photovoltaic power generation panels P, each of which is rectangular long in the right-left direction and the number of which is four in each row in the front-rear direction and is four or more columns in the right-left direction, are flatly arranged and attached onto the mount frame 1, and a solar battery array is formed of all these solar photovoltaic power generation panels P. The inclination angle of the mount frame 1 shown in the figures is set at 10°.

In the mount frame 1, a plurality of vertical bars 11 in the inclined front-rear direction and two front and rear horizontal bars 12 under the vertical bars 11 in the right-left direction are connected together in a grid-like manner by means of a connection metal fitting 6 (FIG. 3) at each intersection position of the horizontal bars 12 and the vertical bars 11 placed on the horizontal bars 12, and a support pillar 2 made of an angularly cylindrical aluminum extrusion molding material correspondingly to each concrete foundation 4B is attached to the rear horizontal bar 12. The front side of the mount frame 1 is supported and fixed to the concrete foundation 4A by means of a mounting bracket 5A in the front horizontal bar 12, and the rear side of the mount frame 1 is supported and fixed to the concrete foundation 4B by means of a mounting bracket 5B at the lower end of the support pillar 2 as shown in FIG. 6.

As shown in FIG. 2 depicting the mount frame 1 seen from the backside, a pair of braces 3 and 3 each of which is made of a hollow aluminum mold material are disposed to be intersected with each other in the manner of the letter X between the adjoining support pillars 2 and 2 at an important position on the rear side of the mount frame 1.

As shown in FIG. 3, the vertical bars 11 of the mount frame 1 are disposed at a rate of two vertical bars with respect to one solar photovoltaic power generation panel P, and the concrete foundations 4A and 4B are disposed with three columns therebetween in the right-left arrangement of the solar photovoltaic power generation panels P including both right and left ends of the mount frame 1. Additionally, as shown in FIG. 3, the vertical bar 11 is provided with an intermediate fastening metal piece 7 that presses and fastens both peripheral edges of the solar photovoltaic power generation panels P and P that are adjacent to each other front and rear (which corresponds to a presser metal fitting 80 described in detail later with reference to FIG. 12 and so forth) and an end fastening metal piece 8 that presses and fastens the peripheral edge of the solar photovoltaic power generation panel P at both front and rear ends of the vertical bar 11 (which corresponds to an end presser metal fitting 100 described in detail later with reference to FIG. 12 and so forth).

Figure 6:
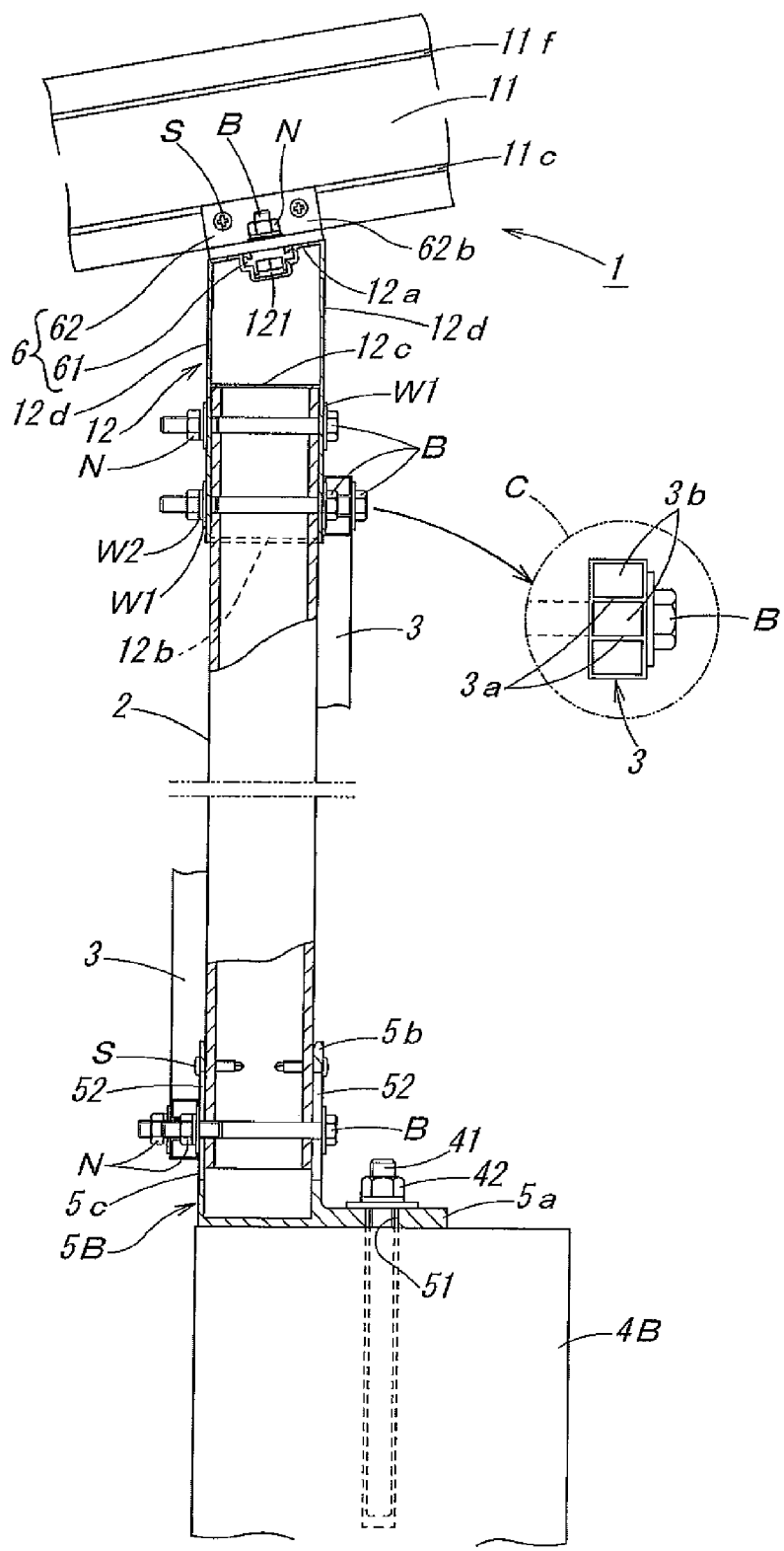
FIG. 6 is a partially cutaway side view of the supporting portion on the rear side.

The concrete foundations 4A and 4B consist of placement foundations placed on the ground G or consist of pile foundations whose lower parts are buried in the earth, and, as shown in FIGS. 4A and 4B or in FIG. 6, an anchor bolt 41 is buried and fastened in a lower hole 40 bored perpendicularly from its top surface by means of a resin-based binder 42 in a state in which its part projects upwardly. As shown in FIG. 1, the front concrete foundation 4A is set to be higher than the rear concrete foundation 4B.

The mounting brackets 5A and 5B are each made of a cut short member of an aluminum extrusion molding material, and a pair of vertical wall portions 5b and 5c are integrally erected in the front-rear direction, and a horizontal plate portion 5a that has a long hole 51 in the right-left direction is formed in one side half portion, and two long holes 52 are bored in the up-down direction in the other side half portion. These mounting brackets 5A and 5B are fixed to the concrete foundations 4A and 4B so as to be positionally adjustable in the right-left direction within the range of the long hole 51 by placing a horizontal plate portion 5a on the top surface of each of the concrete foundations 4A and 4B and by screwing and tightening a nut N to the anchor bolt 41 passing through the long hole 51 by means of a plain washer W1 and a spring washer W2. The mounting bracket 5A corresponding to the front concrete foundation 4A has two upper and lower screw through-holes 53 at both right and left side upper parts of both vertical wall portions 5b and 5c respectively, whereas the mounting bracket 5B corresponding to the rear concrete foundation 4B has two upper and lower screw through-holes 53 at the central upper parts of both vertical wall portions 5b and 5c respectively as shown in FIG. 5.

The horizontal bar 12 of the mount frame 1 is made of a hollow aluminum mold material that is vertically long in a longitudinal section and that is partitioned up and down by an upper wall portion 12a, by right and left sidewall portions 12d and 12d, by a bottom wall portion 12b, and by a partition wall portion 12c having a horizontal internal space, and has a length corresponding to three columns of the solar photovoltaic power generation panels P arranged laterally, and the upper wall portion 12a of the horizontal bar 12 that is inclined correspondingly to the inclination of the vertical bar 11 likewise made of a hollow aluminum mold material vertically long in a longitudinal section has a backwardly-wide sliding guide groove 121 that is contiguous in the longitudinal direction. The front horizontal bar 12 is fixed so as to be positionally adjustable in the up-down direction within the range of the long hole 52 by tightening a nut N to an attachment bolt B passing through the horizontal bar 12 through the long hole 52 of one of both vertical wall portions 5b and 5c in a state in which the lower parts of both its ends are fitted in a space between the vertical wall portions 5b and 5c of the mounting bracket 5A as shown in FIGS. 4A and 4B, and is fastened at a predetermined height by screwing a drilling tapping screw S to the right and left sidewall portions 12d and 12d of the horizontal bar 12 from the outside through the screw through-hole 53 of one of the upper and lower holes (upper one in the figure) of both vertical wall portions 5b and 5c of the mounting bracket 5A at an adjusted position. The adjoining horizontal bars 12 and 12 are brought closer to each end in the same way as shown in FIG. 4B, and are fastened to each mounting bracket 5A in a butting state.

Figure 5:
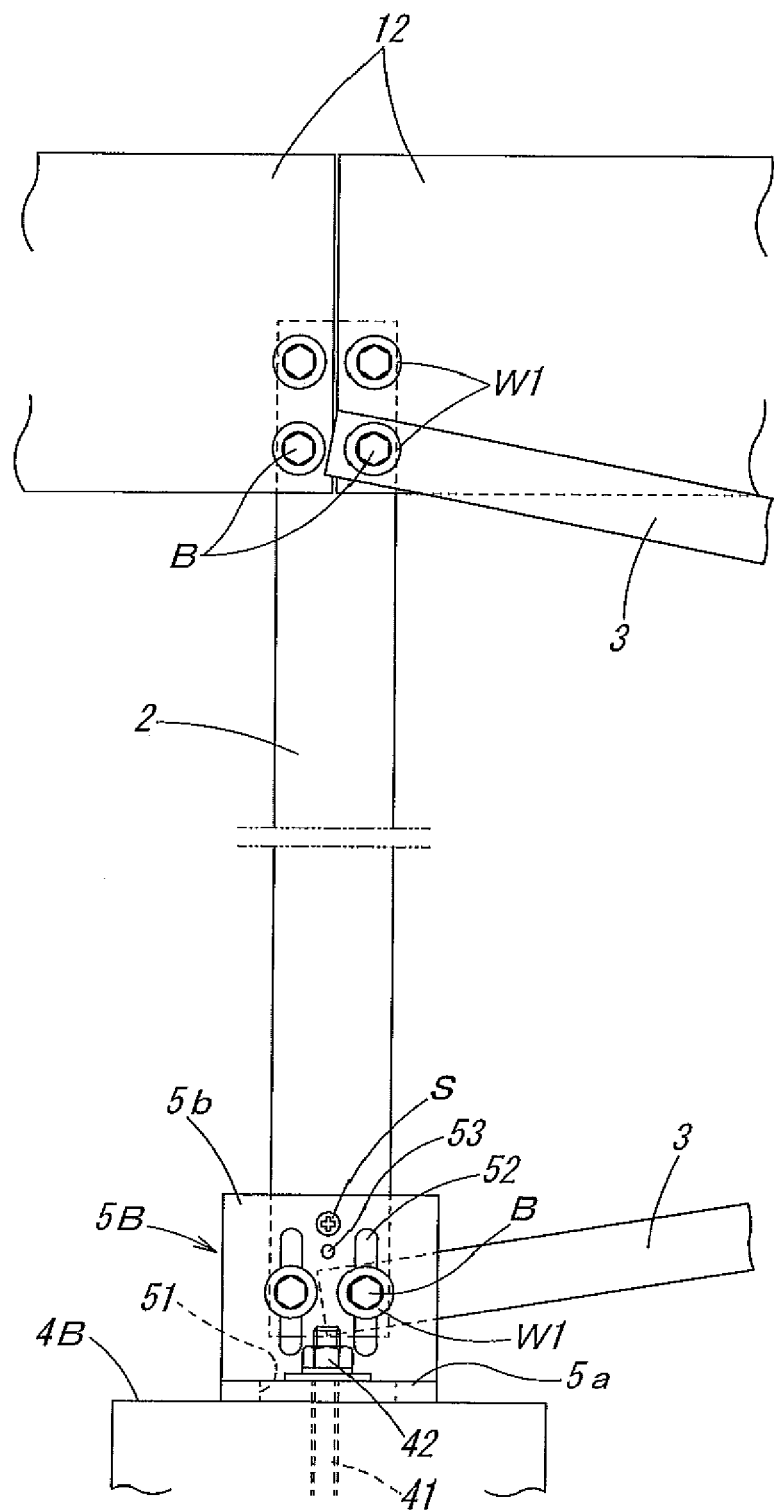
FIG. 5 is a back view showing a supporting portion on the rear side of the solar photovoltaic power generation panel mount.

The bottom wall portion 12b is excised by substantially ½ of the lateral width of the support pillar 2 at both ends of the rear horizontal bar 12, and, as shown in FIG. 5 and FIG. 6, the support pillar 2 is fitted to its excised part in a state in which its upper part is in contact with the partition wall portion 12c with a substantially half width at its one side, and a nut N is tightened to each attachment bolt B passing through two upper and lower places of the fitted part, and, as a result, the rear horizontal bar 12 is supported by the upper end of the support pillar 2. As shown in FIG. 5, the adjoining horizontal bars 12 and 12 are fastened together in a state in which their ends are likewise brought into contact with each other so as to butt against each other at the upper end of the support pillar 2 disposed at the middle in the right-left direction of the mount frame 1. The lower end of each support pillar 2 is fixed so as to be positionally adjustable in the up-down direction within the range of the long hole 52 by tightening a nut N to each attachment bolt B passing through the support pillar 2 through the long holes 52 and 52 of both vertical wall portions 5b and 5c in a state of being fitted to a space between the vertical wall portions 5b and 5c of the mounting bracket 5B, and is fastened at a predetermined height by screwing a drilling tapping screw S to the support pillar 2 from the outside through the screw through-holes 53 of both vertical wall portions 5b and 5c of the mounting bracket 5B at an adjusted position.

Figure 7A:
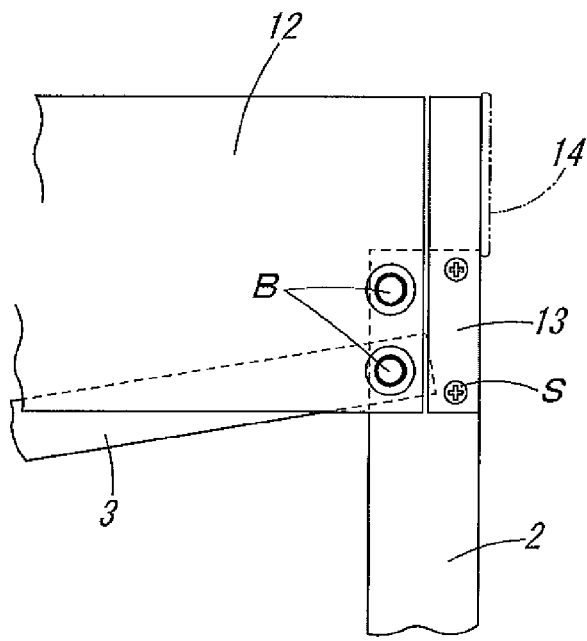
FIG. 7A and FIG. 7B each show a connection portion between a horizontal bar and a support pillar at a left end of the solar photovoltaic power generation panel mount, FIG. 7B being a back view, FIG. 7B being a right side view.
Figure 7B:
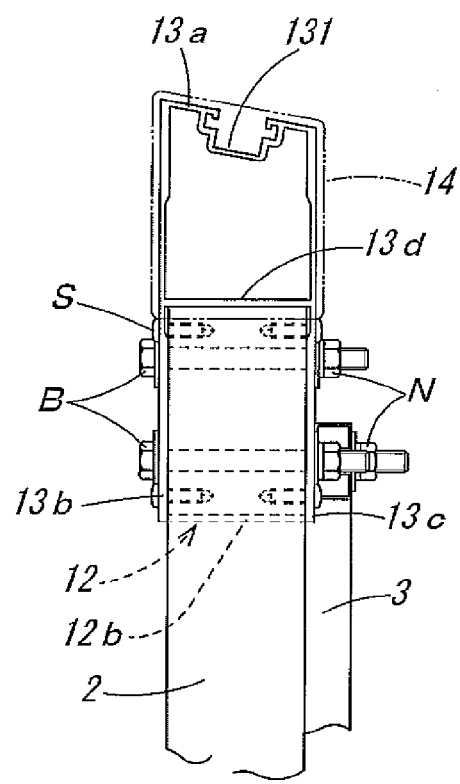

On the other hand, at an upper end of each support pillar 2 disposed at both right and left end positions of the mount frame 1, an end of the horizontal bar 12 is fitted only to an one-side half part of its lateral width, and an one-side half part not connected to the horizontal bar 12 will be exposed if no shaping is applied thereto, which is undesirable from the viewpoint of its external appearance, and therefore, as shown in FIG. 3, FIG. 7A, and FIG. 7B, a yardarm member 13 is attached to the upper-end lateral half part not connected to the horizontal bar of the support pillar 2.

Figure 8:
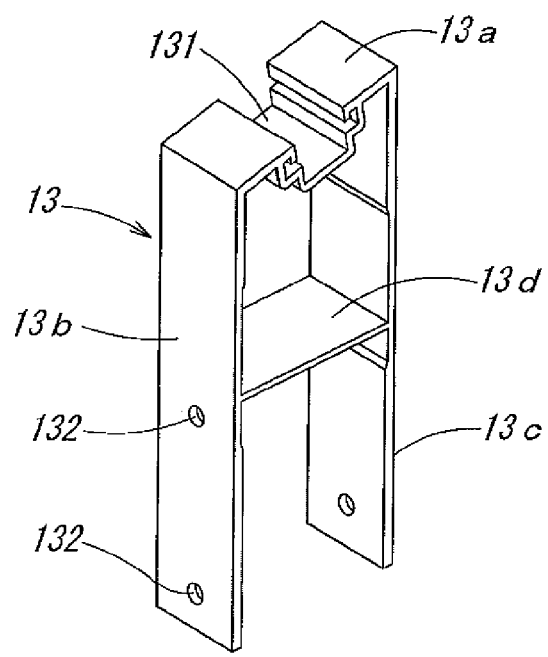
FIG. 8 is a perspective view of a yardarm member that is fastened to the connection portion.

This yardarm member 13 is composed of an upper wall portion 13a that has a backwardly wide groove portion 131 and that is inclined, sidewall portions 13b and 13c drooping from both ends of the upper wall portion 13a, and a partition wall portion 13d that horizontally bridges a space between both sidewall portions 13b and 13c as shown also in FIG. 8, and has screw through-holes 132 at two upper and lower places of lower half parts of both sidewall portions 13b and 13c. The overall width of the yardarm member 13 is set at substantially ½ of the lateral width of the support pillar 2, and its end surface shape and its size correspond to a result obtained by removing the bottom wall portion 12b of the horizontal bar 12. Therefore, the yardarm member 13 is fitted onto the upper end of the support pillar 2 so that the top end of the support pillar 2 comes into contact with the lower surface side of the partition wall portion 13d, and a drilling tapping screw S is screwed into the support pillar 2 from the side through each screw through-hole 132 and is fastened, and, as a result, the upper-end lateral half part not connected to the horizontal bar of the support pillar 2 is covered like an extension of the horizontal bar 12, and an external appearance is improved. Additionally, it is possible to improve the visual quality at both right and left ends on the rear side of the mount frame 1 by attaching a covering material 14 with which the end surface is covered as shown by the phantom line of FIGS. 7A and 7B while using an opening portion of the upper side of the partition wall portion 13d of the yardarm member 13.

A plain washer W1 is disposed on the head side of an attachment bolt B, and a plain washer W1 and a spring washer W2 are disposed on the side of a nut N in each connection portion between the mounting bracket 5A and the front horizontal bar 12, between the mounting bracket 5B and the lower end of the support pillar 2, and between the upper end of the support pillar 2 and the rear horizontal bar 12 (FIG. 4A, FIG. 6). Additionally, a brace 3 that is attached between the support pillars 2 and 2 is fastened by means of one attachment bolt B that is used in a connection portion between the upper end of the support pillar 2 and the horizontal bar 12 and a connection portion between the lower end of the support pillar 2 and the mounting bracket 5B as shown in FIG. 5 and FIG. 6.

The brace 3 is made of a hollow square bar that includes a plurality of reinforcement hollow portions 3b partitioned by a plurality of reinforcement pieces 3a inside as shown in an enlarged view in the phantom line circle C of FIG. 6, and it is possible to strongly fasten each of its ends by allowing an attachment bolt B to pass through the central reinforcement hollow portion 3b. Although the brace 3 is light in weight, but the brace 3 has high rigidity and great strength.

Figure 9:
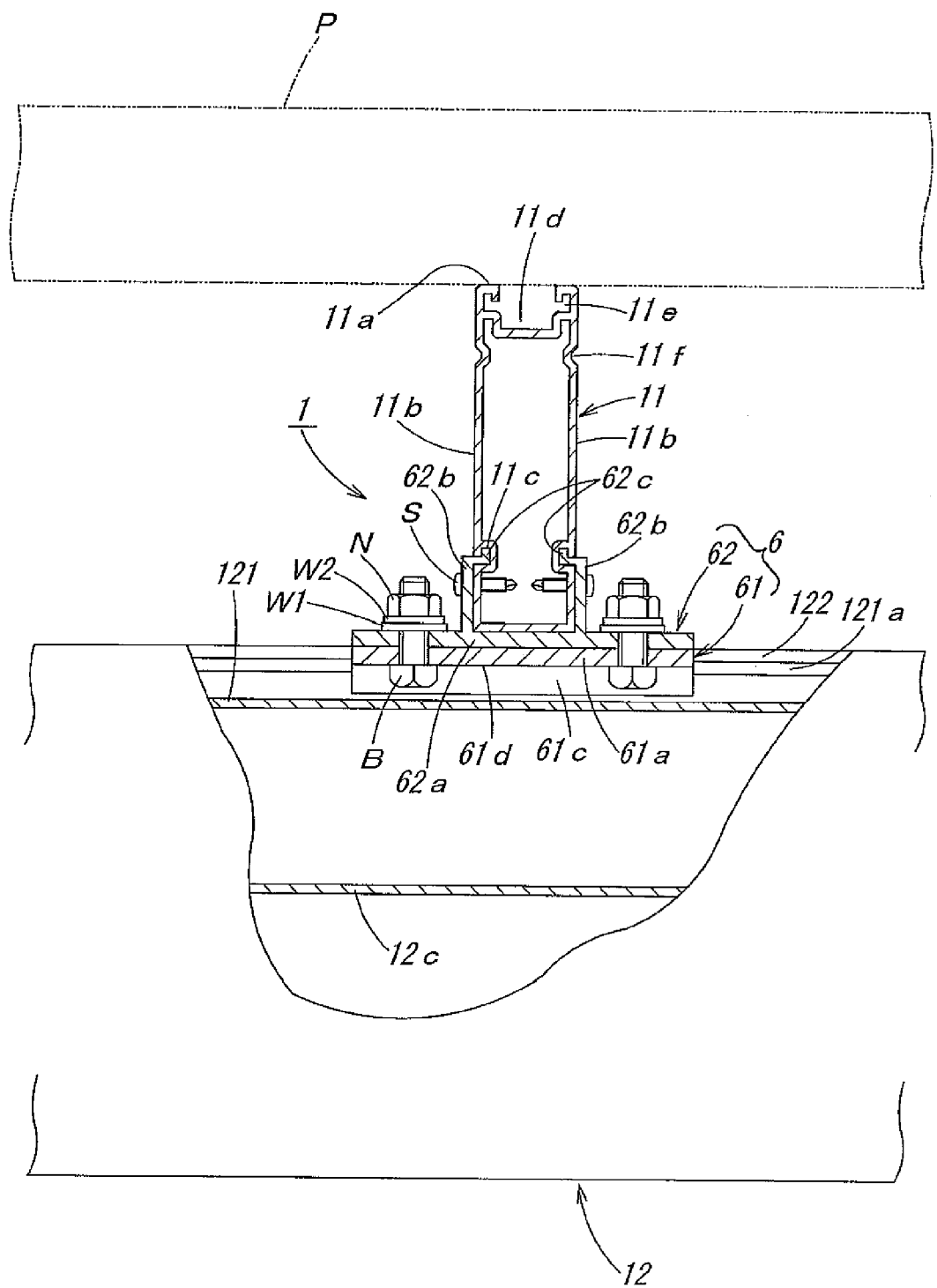
FIG. 9 is a main longitudinal front view showing a connection portion between a vertical bar and a horizontal bar of a mount frame of the solar photovoltaic power generation panel mount.
Figure 10:
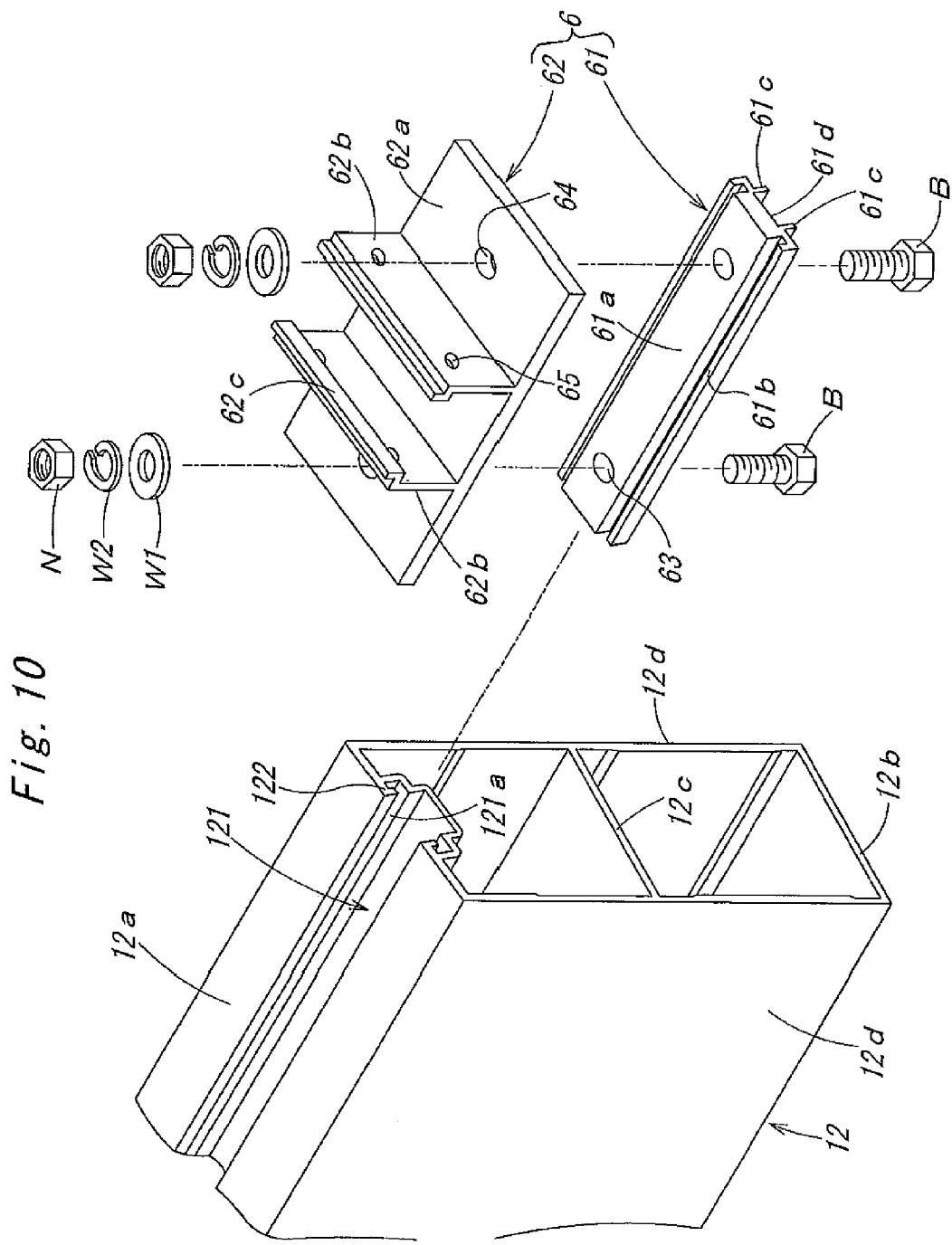
FIG. 10 is a perspective view showing the horizontal bar of the mount frame and frame connection metal fittings.
Figure 11:
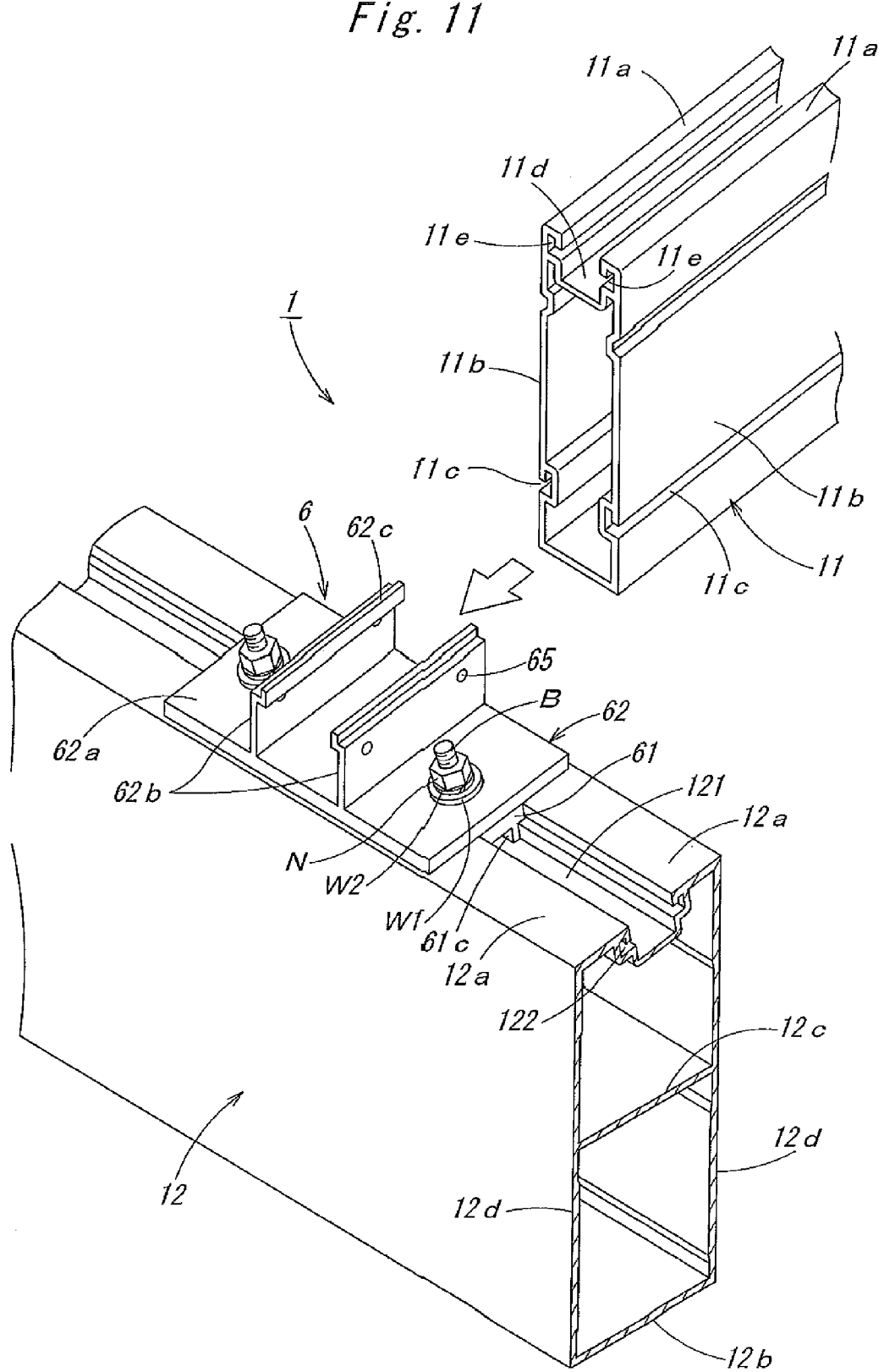
FIG. 11 is a perspective view showing a connecting operation between the horizontal bar and the vertical bar of the mount frame.

The connection metal fitting 6 by which the vertical bar 11 and the horizontal bar 12 of the mount frame 1 are connected together consists of a slide member 61 that is slidably inserted into the sliding guide groove 121 of the horizontal bar 12 and a receiving member 62 disposed on the horizontal bar 12 as shown in FIG. 4A and FIG. 6, and is fixed to a predetermined position in the longitudinal direction of the horizontal bar 12 while sandwiching upper edge portions 12a and 12a of the horizontal bar 12 that are both side edges of the sliding guide groove 121 between both members 61 and 62 by screwing and tightening a nut N to a bolt B that passes through both members 61 and 62 from the lower side. The receiving member 62 is shaped so as to be slid and fitted to the lower part of the vertical bar 11 in the longitudinal direction, and is fixed to a predetermined position in the longitudinal direction of the vertical bar 11 by screwing a drilling tapping screw S from the side in a fitted state. Each of the slide member 61 and the receiving member 62 is made of a cut short member of an aluminum extrusion molding material. The detailed structure of the frame connection metal fitting 6 is shown in FIG. 9 to FIG. 11, and will be described later in detail.

In the solar photovoltaic power generation panel mount arranged as above, the mount frame 1 on which solar photovoltaic power generation panels P are placed is supported and fixed to each concrete foundation 4A by means of the mounting bracket 5A at important positions with a predetermined interval in the front horizontal bar 12, and is supported and fixed to each concrete foundation 4B by means of the mounting bracket 5B in the support pillar 2 attached to the rear horizontal bars 12 with a predetermined interval, and these supporting portions are positionally adjustable by means of the mounting brackets 5A and 5B in the up-down and right-left directions, and therefore, even if the solar battery array is enlarged as a mega solar or as a giga solar, it is possible to easily make the heights and positions of these many supporting portions uniform, and it is possible to obtain high constructional accuracy.

In other words, if the concrete foundations 4A and 4B are placement foundations, the height of its top will easily become uneven because of the irregular ruggedness of the installation surface, whereas if the concrete foundations 4A and 4B are pile foundations, the height of its top will also easily become uneven because of variation in burying depth, and the concrete foundations 4A and 4B are both heavy, and therefore these concrete foundations easily cause positional deviation when these are successively lifted up by a mechanical force and are set with predetermined intervals in the right-left direction, and yet it is possible to easily make the positions of supporting portions on the side of the mount frame 1 uniform by performing positional adjustment in the up-down and right-left directions through the mounting brackets 5A and 5B without performing positional correction that requires a laborious effort for the concrete foundations 4A and 4B. Additionally, even if some of the concrete foundations 4A and 4B reach a floating state because of the uneven settlement of the ground after having undergone construction operations or because of surface erosion by means of rainwater etc., it will be possible to beforehand avoid damage to the solar photovoltaic power generation panel P caused by stress concentration when earthquake movement or wind pressure is received by readjusting the upper and lower positions of the supporting portions so as to return to a state in which a normal load is applied.

An arrangement in which a support pillar is also disposed on the lower front side of the inclined mount frame 1 and in which the lower end of the support pillar is supported and fixed to the concrete foundation 4A by means of the mounting bracket 5A in the same way as in the rear side can be employed as the solar photovoltaic power generation panel mount of the present invention. Therefore, if an arrangement in which the horizontal bar 12 is fixed directly to the mounting bracket 5A on the front side on which the inclined mount frame 1 is lower and in which the horizontal bar 12 is fixed to the mounting bracket 5B by means of the support pillar 2 on the rear side on which the inclined mount frame 1 is higher is employed as in the aforementioned embodiment, the front side is rigidly strongly supported and fixed to the concrete foundation 4A, and therefore, even if the great shock of an earthquake or wind pressure is received, the solar photovoltaic power generation panel mount is prevented from being collapsed, and damage or deformation is not easily caused, and no use of the support pillar on the front side makes it possible to reduce the number of members, and hence makes it possible to facilitate an assembly operation, and makes it possible to reduce costs for the members.

Additionally, in an arrangement in which the lower front side of the mount frame 1 is fixed directly to the mounting bracket 5A, earthquake-resistance strength and wind-pressure-resistance strength are made higher by disposing the brace 3 between the support pillars 2 and 2 on the rear side on which the mount frame 1 is higher. Additionally, it is possible to reliably separate a lower frame-front end upwardly from the installation surface by means of the higher concrete foundation 4A by setting the front concrete foundation 4A higher than the rear concrete foundation 4B as in the embodiment even if the front support position of the mount frame 1 is set at a position deeper rearwardly than the frame front end, and, on the other hand, even if the rear support position of the mount frame 1 is set at a position deeper forwardly than the frame rear edge, the support pillar 2 is lengthened by the low concrete foundation 4B, and the inclination angle of the brace becomes large correspondingly, and therefore it is possible to raise a stiffening effect. The distance between the front and rear support positions is shortened by supporting the front side and the rear side of the mount frame 1 at deeper positions in this way, and therefore it becomes correspondingly difficult for the mount frame 1 to bend in the front-rear direction, and the overall strength is heightened as a mount structure.

In the present invention, it is possible to employ various metal pieces, which differ from each other in mechanism and in structure for positional adjustments in the up-down and left-right directions, as mounting brackets disposed between the concrete foundations 4A, 4B and the front and rear supporting portions of the mount frame 1. Therefore, in the mounting brackets 5A and 5B each of which has the horizontal plate portion 5a that has a long hole 51 in the right-left direction and the vertical wall portions 5b and 5c each of which has a long hole 52 in the up-down direction as in the embodiment, the anchor bolt 41 that protrudes from its top surface is tightened and fastened to the concrete foundations 4A and 4B by means of the nut N through the long hole 51, and the attachment bolt B is passed through the long hole 52 and is merely tightened and fastened to supporting portions (horizontal bar 12, support pillar 2) on the side of the mount frame 1 by means of the nut N, and, as a result, positional adjustments in the up-down and left-right directions are reliably made to the supporting portions, and therefore it is possible to obtain high operation efficiency while performing an easy operation, and the metal pieces serving as metal fittings are extremely simple in structure, and, advantageously, it is possible to produce it at low cost. Additionally, although the vertical wall portions 5b and 5c are shaped to have parallel plates each of which has the long hole 52 in the up-down direction in the embodiment, the vertical wall portions 5b and 5c may be shaped to have an upright cylindrical structure, angle structure, or channel structure.

Although the vertical bars 11 inclined in the front-rear direction are disposed on the upper side whereas the horizontal bars 12 are disposed on the lower side in the mount frame 1 illustrated as an embodiment, the vertical bar 11 and the horizontal bar 12 may be opposite to each other in the upper-lower relationship in the present invention. For example, when the solar photovoltaic power generation panels P are each long in the inclined front-rear direction, the number of solar photovoltaic power generation panels arranged in the inclined direction becomes small, and therefore it is recommended to form an arrangement in which the horizontal bars 12 the number of which is increased so that the respective panels P can be supported at a plurality of places are set on the upper side, and these horizontal bars 12 are received by the vertical bars 11 that are spaced correspondingly to the concrete foundations 4A and 4B, and the concrete foundations 4A and 4B are allowed to support it at the front and rear sides of each vertical bar 11.

By the way, although the horizontal bar 12 of the mount frame 1 is made of a hollow aluminum mold material that is vertically long in a longitudinal section and that has a length corresponding to three columns of the solar photovoltaic power generation panels P arranged laterally, and is shown in FIG. 4 and FIG. 6 as above, the horizontal bar 12 is additionally composed of the upper wall portion 12a inclined correspondingly to the inclination of the vertical bar 11, the front and rear sidewall portions 12d and 12d, the bottom wall portion 2b, and the partition wall portion 12c that partitions an inner space into upper and lower parts as shown in FIG. 9 to FIG. 11 in detail, and has the sliding guide groove 121 continuous in the longitudinal direction in the center in the width direction of the upper wall portion 12a. In this sliding guide groove 121, both its side edges 122 and 122 each have the shape of the reverse-L letter in the longitudinal section and protrude inwardly, and the lower side of each side edge 122 has an engagement groove portion 121a concaved in the shape of the letter L in the longitudinal section, and is backwardly-wide at the positions of both engagement groove portions 121a and 121a.

The vertical bar 11 of the mount frame 1 is made of a hollow aluminum mold material that is vertically long in a longitudinal section and that has a length that slightly exceeds the overall length of the solar photovoltaic power generation panels P arranged front and rear, and the engagement groove portion 11c concaved in the shape of the letter L in the longitudinal section is formed in the lower side of both side surfaces 11b and 11b, and the sliding guide groove 11*d* having the same sectional shape as the sliding guide groove 121 of the horizontal bar 12 is formed in the upper surface 11*a* over the overall length in the longitudinal direction as shown in FIG. 9 and FIG. 11. The sliding guide groove 11*d* is used to slide and fit the intermediate fastening metal piece 7 and the end fastening metal piece 8 (see FIG. 3).

By the way, the frame connection metal fitting 6 shown also in FIG. 4A and FIG. 6 that connects the vertical bar 11 and the horizontal bar 12 together is composed of the slide member 61 that is fitted into the sliding guide groove 121 of the horizontal bar 12 and the receiving member 62 disposed thereon as shown also in FIG. 9 to FIG. 11 in detail. The slide member 61 and the receiving member 62 are each made of a cut short member of an aluminum molding material.

The slide member 61 has an engagement strip portion 61*b* having the shape of the letter L in the longitudinal section on both sides in the width direction of a band-plate-shaped board portion 61*a*, and a pair of parallel leg pieces 61*c* and 61*c* are constructed on the lower surface side of the board portion 61*a*, and a bolt through-hole 63 in the up-down direction is bored in both sides in the longitudinal direction of the board portion 61*a*. The receiving member 62 includes a board portion 62*a* having a front-rear width corresponding to an upper plate portion 12*a* of the horizontal bar 12 and having a right-left width corresponding to the slide member 61 and two parallel sandwiching wall portions 62*b* that protrude upwardly in the front-rear direction from the central side of the board portion 62*a*, and an engagement piece 62*c* that has the shape of the letter L in the longitudinal section and that protrudes inwardly is formed at each upper end of both sandwiching wall portions 62*b* and 62*b*, and a bolt through-hole 64 in the up-down direction is bored in both right and left sides of the board portion 62*a* correspondingly to the slide member 61, and a pair of screw through-holes 65 and 65 are formed in the upper part of each sandwiching wall portion 62*b*. The interval between both sandwiching wall portions 62*b* and 62*b* of the receiving member 62 corresponds substantially to the width of the vertical bar 11, and each engagement piece 62*c* is dimensionally set so as to engage the engagement groove portion 11*c* of the vertical bar 11.

In order to construct the mount frame 1 by connecting the vertical bars 11 and the horizontal bars 12 together in a grid-like manner by means of the frame connection metal fittings 6, the slide members 61 the number of which corresponds to the intersection portions intersecting with the vertical bars 11 are slid and fitted, in a state of inserting the fixing bolt B in each bolt through-hole 63 from below, to the sliding guide groove 121 from one end side with respect to each of the front and rear horizontal bars 12 beforehand supported and fixed onto the concrete foundations 4A and 4B as described later. As a result, each slide member 61 is held by the sliding guide groove 121 so as to be slidable and so as to be upwardly inseparable in a state in which each engagement strip portion 61*b* on both sides engages the engagement groove portion 121*a* of the sliding guide groove 121 and in a state in which each of two fixing bolts B protrudes upwardly from the sliding guide groove 121 while its head is contained in the concave portion 61*d* between both leg pieces 61*c* and 61*c*. Thereafter, as shown in FIG. 11, the receiving member 62 is placed on each slide member 61, and a nut N is screwed to a fixing bolt B passing through each bolt through-hole 64 of the board portion 62*a* by means of a plain washer W1 and a spring washer W2. The concave portion 61*d* of the slide member 61 is set at a width that makes the head of the fixing bolt B impossible to rotate.

Accordingly, each frame connection metal fitting 6 composed of the slide member 61 and the receiving member 62 mounted on the slide member 61 is slidable in the longitudinal direction of the horizontal bar 12 in a state in which the tightening of the nut N has been loosened, and hence is successively moved to each intersection portion that intersects with the set vertical bar 11. Thereafter, in each intersection portion, the vertical bar 11 is slid and fitted to a space between both sandwiching wall portions 62*b* and 62*b* of the receiving member 62 of the frame connection metal fitting 6 from behind as shown in FIG. 11, and the engagement pieces 62*c* and 62*c* of the receiving member 62 are engaged with the engagement groove portions 11*c* and 11*c* on both sides of the vertical bar 11, respectively.

The vertical bar 11 that has been slid and fitted to the receiving member 62 of the frame connection metal fitting 6 is upwardly inseparable because the engagement pieces 62*c* and 62*c* engage the engagement groove portions 11*c* and 11*c* as mentioned above, whereas the vertical bar 11 is slidable in the longitudinal direction, i.e., in the inclined front-rear direction, and the frame connection metal fitting 6 is also movable in the longitudinal direction of the horizontal bar 12, i.e., in the right-left direction when the nut N is in a loosened state, and therefore the vertical bar 11 reaches a temporarily assembled state in which the vertical bar 11 is movable both in the front-rear direction and in the right-left direction with respect to the horizontal bar 12. Therefore, the front and rear connection portions (intersection portions) of each vertical bar 11 are positionally adjusted in a temporarily assembled state with respect to the front and rear horizontal bars 12, thus making it possible to accurately set the arrangement of the whole of the mount frame 1. Thereafter, the nuts N on both sides of the frame connection metal fitting 6 are tightened in this arrangement-setting state, and, as a result, both side edges 122 and 122 of the sliding guide groove 121 of the horizontal bar 12 (see FIG. 10) is sandwiched between the engagement strip portions 61*b*, 61*b* on both sides of the slide member 61 (see FIG. 10) and the board portion 62*a* of the receiving member 62, and the frame connection metal fitting 6 is fixed to the horizontal bar 12, and, as a result, the vertical bar 11 becomes unmovable in the right-left direction, and thereafter a drilling tapping screw S (FIG. 9) is passed through each screw through-hole 65 of both sandwiching wall portions 62*b* and 62*b* of the receiving member 62 from the outside and is screwed and is passed through the sidewall portion of the vertical bar 11, and, as a result, the vertical bar 11 becomes unmovable also in the front-rear direction, and the vertical bar 11 and the horizontal bar 12 reach a state of being rigidly strongly connected together at an intersection portion.

In the solar photovoltaic power generation panel mount arranged as above, the frame connection metal fitting 6 is fitted to the sliding guide groove 121 formed in the upper surface of the horizontal bar 12 that is on the lower side so as to be slidable and so as to be upwardly inseparable in each intersection portion between the vertical bar 11 and the horizontal bar 12 of the mount frame 1, and the vertical bar 11 is slid and fitted to a space between both sandwiching wall portions 62*b* and 62*b* protruding upwardly of the frame connection metal fitting 6 in such a way that the engagement piece 62*c* of the sandwiching wall portion 62*b* engages each engagement groove 11*c* on both sides of the vertical bar 11 that is on the upper side, and therefore it is possible to freely perform positional adjustment by moving the frame connection metal fitting 6 along the sliding guide groove 121 of the horizontal bar 12 in the right-left direction and by moving the vertical bar 11 between both sandwiching wall portions 62b and 62b of the frame connection metal fitting 6 in the front-rear direction. Therefore, the intersection portion between the vertical bar 11 and the horizontal bar 12 is accurately positioned in a temporarily assembled state in the whole of the mount frame 1, and the frame connection metal fitting 6 of each intersection portion is fixed to the vertical bar 11 and to the horizontal bar 12, thus making it possible to efficiently construct the mount frame 1 with high dimensional accuracy without requiring a frequent positional correction.

Additionally, although the position and the number of intersection portions between the vertical bar 11 and the horizontal bar 12 in the mount frame 1 supporting the solar photovoltaic power generation panels P (which is the number of the vertical bars 11 intersecting with the horizontal bar 12 if the bar on the lower side is the horizontal bar 12 as in the embodiment) vary in accordance with differences in size and in aspect ratio among the solar photovoltaic power generation panels P to be used, no limitations are imposed on the range of positional adjustments in the up-down and right-left directions in each intersection portion, and the number of frame connection metal fittings 6 to be fitted to the sliding guide groove 121 can be arbitrarily set, and therefore, advantageously, it is possible to perform operations corresponding to changes in the position and in the number utterly without trouble.

Additionally, the frame connection metal fitting 6 in the embodiment is composed of the slide member 61 that is fitted to the sliding guide groove 121 of the horizontal bar 12 and the receiving member 62 disposed on the slide member 61, and a structure is formed such that both side edges 122 and 122 of the sliding guide groove 121 are sandwiched between both members 61 and 62 and are fixed to the horizontal bar 12 by screwing and tightening a nut N to a fixing bolt B passing through each of the members 61 and 62, and, on the other hand, are screwed to the vertical bar 11 that has been slid and fitted between both sandwiching wall portions 62b and 62b of the receiving members 62 by use of a drilling tapping screw S, and therefore it is possible to fix the horizontal bar 12 to an arbitrary position in the longitudinal direction (right-left direction) of the horizontal bar 12, and it is possible to fix the vertical bar 11 to an arbitrary position in its longitudinal direction (front-rear direction) with respect to the frame connection metal fitting 6. Additionally, a screw hole or a bolt through-hole to fix a connection metal fitting is not required for the horizontal bar 11 and for the vertical bar 12, and therefore a hole-boring process (usually, which is performed in a construction site) necessary to make those holes is excluded, and construction efficiency is correspondingly improved.

Additionally, in the frame connection metal fitting 6 of the embodiment, the fixing bolt B is passed through the board portion 62a of the receiving member 62 and through the slide member 61 from below at positions outside both sandwiching wall portions 62b and 62b of the receiving member 62, and the head of the fixing bolt B is contained in the concave portion 61c on the lower surface side of the slide member 61, and therefore it is possible to easily temporarily assemble the vertical bars 11 and the horizontal bars 12 without trouble in a not-screwed state or a loosened state of the nut N with respect to the fixing bolt B, and the frame connection metal fitting 6 is tightened and fixed to the horizontal bar 12 at two places, and, likewise in the vertical bar 11, a drilling tapping screw S is screwed to the vertical bar 11 through the screw through-hole 65 on both sides, and therefore both bars 11 and 12 are connected together rigidly strongly, and it is possible to obtain great connection strength.

On the other hand, advantageously, if an aluminum molding material is used for the vertical bar 11 and the horizontal bar 12 of the mount frame 1 and for the slide member 61 and the receiving member 62 of the frame connection metal fitting 6 as in the embodiment, it is possible to lighten the whole of the mount frame 1, and it is possible to produce those components at low cost.

In the solar photovoltaic power generation panel mount of the present invention, the upper-lower relationship between the vertical bar 11 and the horizontal bar 12 of the mount frame 1 may be opposite to that of the aforementioned embodiment. For example, when the solar photovoltaic power generation panels P are each long in the inclined front-rear direction, the number of solar photovoltaic power generation panels arranged in the inclined direction becomes small, and therefore it is recommended to form an arrangement in which the horizontal bars 12 the number of which is increased so that the respective panels P can be supported at a plurality of places are set on the upper side, and these horizontal bars 12 are received by the vertical bars 11 that are spaced correspondingly to the concrete foundations 4A and 4B, and the concrete foundations 4A and 4B are allowed to support it at the front and rear sides of each vertical bar 11. Additionally, in the present invention, it is possible to employ an arrangement in which a support pillar is also disposed on the lower front side of the inclined mount frame 1 and in which the lower end of the support pillar is supported and fixed to the concrete foundation 4A by means of the mounting bracket 5A in the same way as in the rear side. Therefore, if the front horizontal bar 12 is fixed directly to the mounting bracket 5A as in the embodiment, the lower front side is rigidly strongly supported and fixed to the concrete foundation 4A, and therefore, advantageously, even if the great shock of an earthquake or wind pressure is received, the mount is prevented from being collapsed, and damage or deformation is not easily caused, and no use of the support pillar on the front side makes it possible to reduce the number of members, and hence makes it possible to correspondingly facilitate an assembly operation, and makes it possible to reduce costs for the members.

Figure 12:
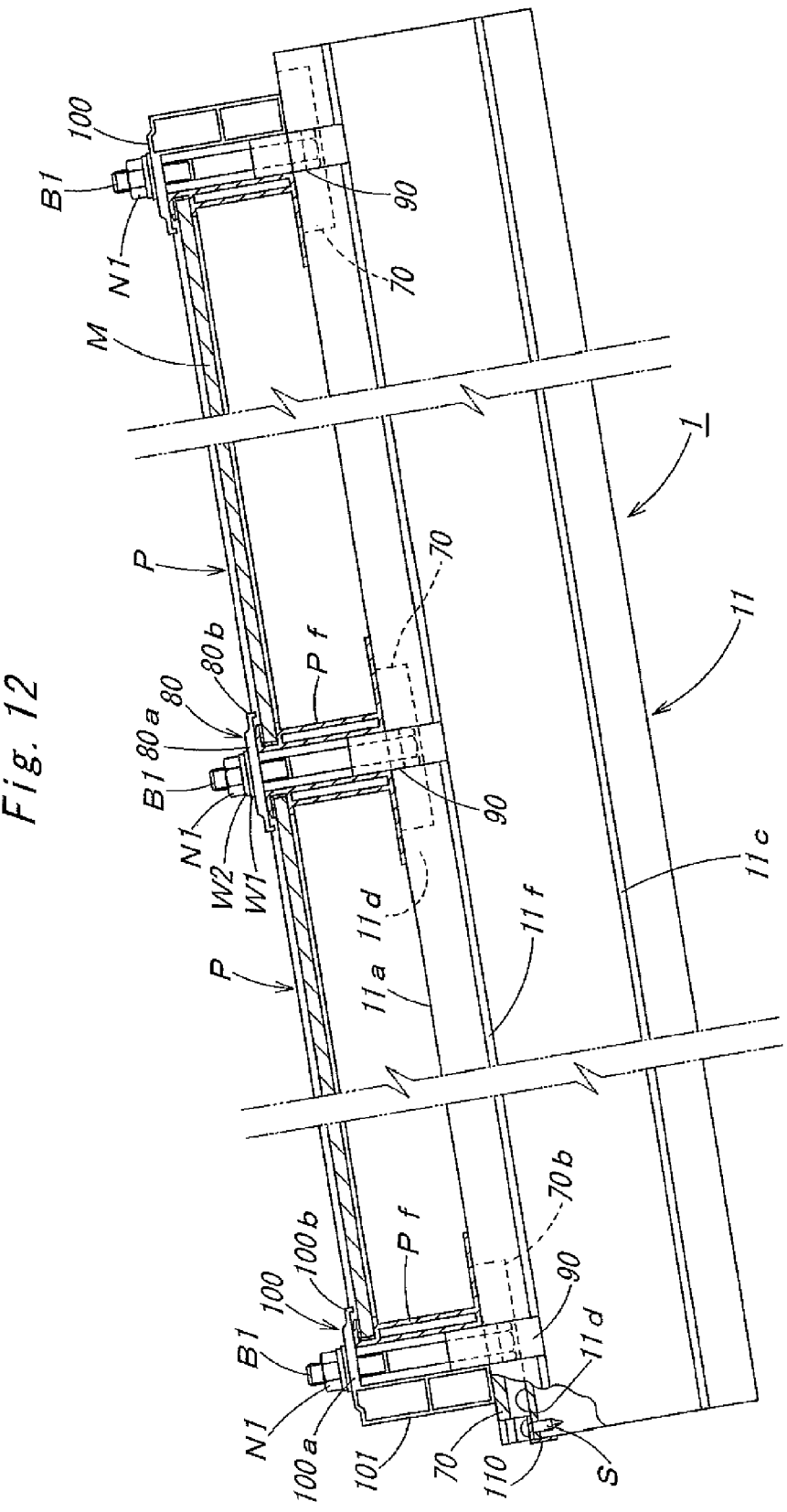
FIG. 12 is a partially cutaway longitudinal side view showing a solar photovoltaic power generation panel that has been attached to the mount frame of the solar photovoltaic power generation panel mount.
Figure 13:
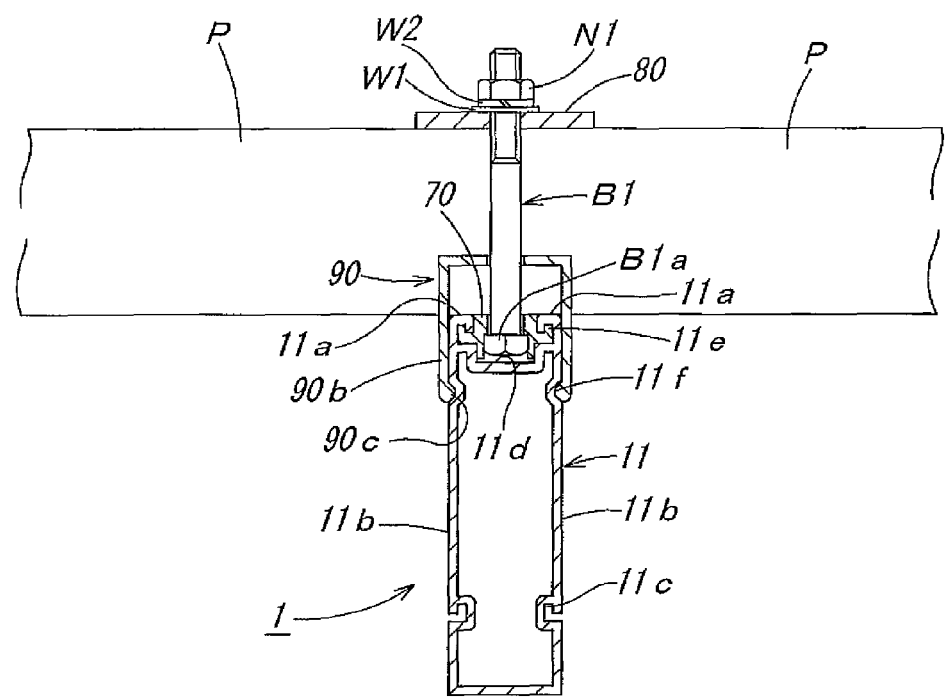
FIG. 13 is a longitudinal sectional front view showing the solar photovoltaic power generation panel and the vertical bar of the mount frame that have been attached to each other.

As shown in FIG. 12 and FIG. 13, each solar photovoltaic power generation panel P is placed on the vertical bars 11 of the mount frame 1, and is fixed to the mount frame 1 by means of a slide metal fitting 70 fitted to the sliding guide groove 11d of the upper surface of the vertical bar 11, by means of a fastening bolt B1 that passes through the slide metal fitting 70 from below, by means of a presser metal fitting 80 or an end presser metal fitting 100 that is fitted to the fastening bolt B1, and by means of a nut N1 that is screwed to the fastening bolt B1. A spacer metal fitting 90 is fitted to each fastening bolt B1.

The vertical bar 11 of the mount frame 1 is made of a hollow aluminum extrusion molding material that is vertically-long rectangular in a longitudinal section and that has a length that slightly exceeds the overall length of the solar photovoltaic power generation panels P arranged front and rear, and, as shown in FIG. 13 and FIG. 14, its upper surface has a sliding guide groove 11d continuous in the longitudinal direction, and engagement grooves 11f and 11c continuous in the longitudinal direction are formed in the upper and lower parts of both its side surfaces. The sliding guide groove 11d has engagement groove portions 11e and 11e that are concaved in the shape of the letter L in the longitudinal section in the inner surfaces of both its sides, and is backwardly wide at the positions of these engagement groove portions 11e and 11e. The upper engagement groove 11f has a simple hollow, whereas the lower engagement groove 11c is concaved in the shape of the letter L in the longitudinal section.

The slide metal fitting 70 is made of a cut short member of an aluminum extrusion molding material, and, as shown in FIG. 14A in detail, parallel two leg pieces 70b and 70b are erected on the lower surface side of a thick board portion 70a that is formed in a band-plate shape long in the sliding direction, and engagement strip portions 70c and 70c each of which has the shape of the letter L in the longitudinal section are disposed on both sides in the width direction of the board portion 70a, and a bolt through-hole 71 that passes upwardly and downwardly is formed in the central part of the board portion 70a. This slide metal fitting 70 is held so as to be slidable in the longitudinal direction of the vertical bar 11 and so as to be upwardly inseparable because both engagement strip portions 70c and 70c are engaged with the engagement groove portions 11e and 11e by being fitted into the sliding guide groove 11d of the vertical bar 11 from one end side. In this fitted state, the slide metal fitting 70 is dimensionally set so that the upper surface of the board portion 70a of the slide metal fitting 70 becomes substantially equal in height to the upper end of the vertical bar 11 and so that both leg pieces 70b and 70b come substantially into contact with the inner bottom of the sliding guide groove 11d as shown in FIG. 13.

The fastening bolt B1 is a general hexagon bolt, and is set so that its hexagonal head B1a is contained non-rotationally between both leg pieces 70b and 70b of the slide metal fitting 70 by being passed through the bolt through-hole 71 of the slide metal fitting 70 from below.

Figure 16:
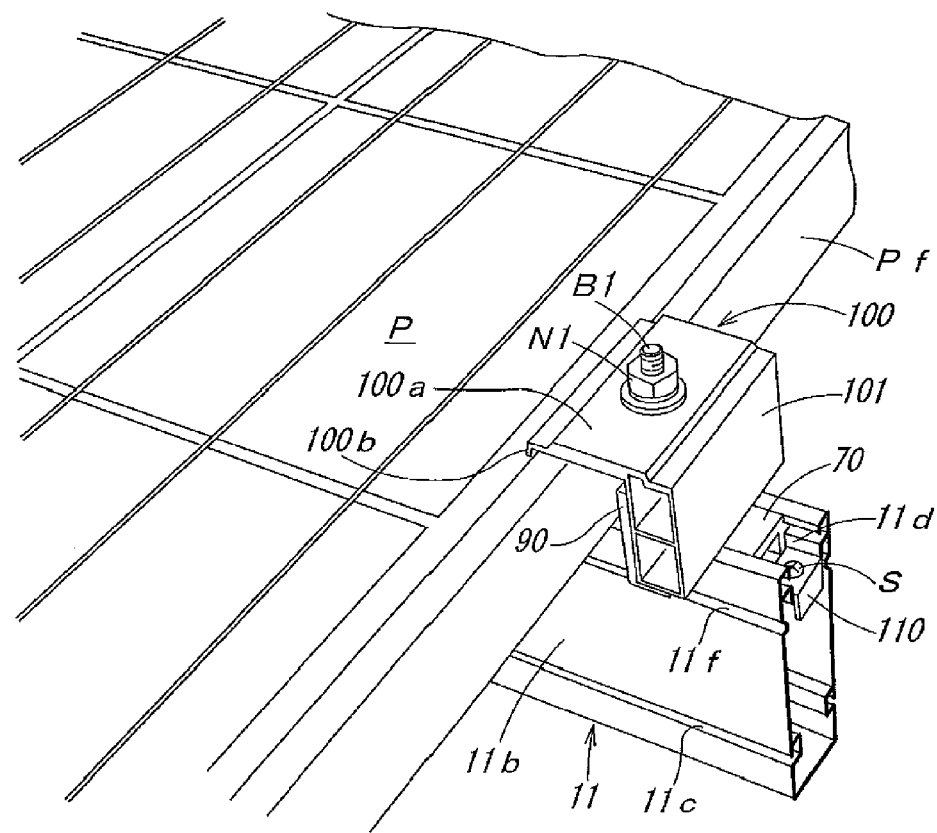
FIG. 16 is a perspective view showing an end of the mount frame to which the solar photovoltaic power generation panel has been attached.

The presser metal fitting 80 is used to fix the solar photovoltaic power generation panel P in an intermediate part in the front-rear direction of the mount frame 1 as shown in FIG. 12 and FIG. 13, and is equivalent to the intermediate fastening metal piece 7 shown in FIG. 3, and is made of a cut short member of an aluminum extrusion molding material shaped in a substantially square plate, and an engagement piece 80b having the shape of the reverse-L letter in the longitudinal section is provided at each of both side edges of the board portion 80a. The end presser metal fitting 100 is used to fix an end of the solar photovoltaic power generation panel P at both front and rear ends of the mount frame 1 as shown in FIG. 12 and FIG. 16, and is equivalent to the end fastening metal piece 8 shown in FIG. 3, and is made of a cut short member of an aluminum extrusion molding material in the same way as the presser metal fitting 80, and an engagement piece 100b having the shape of the reverse-L letter in the longitudinal section is provided at one side edge of a rectangular board portion 100a, whereas a lateral cover portion 101 is provided so as to be drooped at the other side edge of the rectangular board portion 100a. A bolt through-hole (not shown) is bored in the presser metal fitting 80 and in the end presser metal fitting 100.

The spacer metal fitting 90 is made of a cut short member of an aluminum extrusion molding material having the frame shape of an angular "U" opened downwardly, and a bolt through-hole 91 is formed in its upper plate portion 90a as shown in FIG. 14A, and an engagement convex portion 90c that protrudes inwardly is formed at each of the lower ends of both side pieces 90b and 90b. This spacer metal fitting 90 is set so that it can be slid and fitted to the vertical bar 11 upwardly-inseparably in such a way that both engagement convex portions 90c and 90c are engaged with both engagement grooves 11f and 11 f of the vertical bar 11, respectively.

Among the slide metal fitting 70, the fastening bolt B1, and the spacer metal fitting 90, as shown in FIG. 14B, the spacer metal fitting 90 is slid and fitted to the vertical bar 11 at the same time as the slide metal fitting 70 is fitted into the sliding guide groove 11d of the vertical bar 11 in a state in which the fastening bolt B1 has been passed through both bolt through-holes 71 and 91 of the slide metal fitting 70 and the spacer metal fitting 90 disposed on the slide metal fitting 70 from below. As a result, the fastening bolt B1 is stably held in a state in which the fastening bolt B1 stands upright from the slide metal fitting 70, and the upper plate portion 90a of the spacer metal fitting 90 is also stably held at a predetermined height from the vertical bar 11.

On the other hand, in the front end of each vertical bar 11 that is inclined forwardly low, a stopper member 110 made of a metallic plate bent in the shape of the letter L is fastened to the bottom surface of the front end of the sliding guide groove 11d by means of a drilling tapping screw S as shown in FIG. 12. As a result, the slide metal fitting 70 that has been fitted in the sliding guide groove 11d is prevented from falling off forwardly from the sliding guide groove 11d by allowing the leg piece 70b to come into contact with the stopper member 110.

In order to attach the solar photovoltaic power generation panels P to the mount frame 1, a necessary number of slide metal fittings 4 each of which is united with the fastening bolt B1 and the spacer metal fitting 90 as mentioned above are beforehand fitted in the sliding guide groove 11d of each vertical bar 11 (note that the necessary number of slide metal fittings is one+the number of solar photovoltaic power generation panels P arranged in the front-rear direction (inclined direction) (the number of slide metal fittings is five if the number of solar photovoltaic power generation panels P in the front-rear direction (inclined direction) is four as in FIG. 1 and FIG. 3)), and a necessary number of solar photovoltaic power generation panels P are placed on the vertical bar 11 successively from the front row side while disposing the slide metal fitting 70 at the front and rear ends and therebetween. At this time, the foremost slide metal fitting 70 fitted in the sliding guide groove 11d of each vertical bar 11 is stopped in a state in which it is in contact with the stopper member 110, and therefore it is possible to efficiently arrange the solar photovoltaic power generation panels P in such a way as to forwardly and closely move the plurality of the solar photovoltaic power generation panels P in the front-rear direction while sliding the plurality of the solar photovoltaic power generation panels P along the inclination of the vertical bar 11.

As shown in FIG. 12, in the intermediate part in the front-rear direction of the mount frame 1, the presser metal fitting 80 is fitted to the fastening bolt B1 protruding from the slide metal fitting 70 in a state of bringing the facing surfaces of rectangular frame bodies Pf and Pf of the solar photovoltaic power generation panels P and P adjoining front and rear into contact with the spacer metal fitting 90 united with the slide metal fitting 70, and both engagement pieces 80b and 80b of the presser metal fitting 80 are disposed so as to face both rectangular frame bodies Pf and Pf, and a nut N1 is screwed and tightened to a fastening bolt B1 by means of a plain washer W1 and a spring washer W2, and, as a result, the rectangular frame bodies Pf and Pf of both solar photovoltaic power generation panels P and P are firmly sandwiched between the presser metal fitting 80 and the vertical bar 11. Likewise, in the front and rear ends of the mount frame 1, the end presser metal fitting 100 is fitted to the fastening bolt B1 so that the side of the engagement piece 100b is directed toward the solar photovoltaic power generation panel P, and a nut N1 is screwed and tightened to the fastening bolt B1 from thereabove in a state in which the front side surface or the rear side surface of the rectangular frame body Pf of the solar photovoltaic power generation panel P at the end position is in contact with the spacer metal fitting 90, and, as a result, the rectangular frame bodies Pf and Pf of both solar photovoltaic power generation panels P and P are firmly sandwiched between the end presser metal fitting 100 and the vertical bar 11. In the front and rear ends, the shank part of the fastening bolt B1 and the spacer metal fitting 90 are laterally covered with a lateral cover portion 101 of the presser metal fitting 100 as shown in FIG. 12, and therefore the front and rear exteriors of the solar photovoltaic power generation panel mount become excellent.

In the solar photovoltaic power generation panel mount arranged as above, when a solar photovoltaic power generation panel P in which a solar battery module M is fitted in a rectangular frame body Pf is attached to the mount frame 1, it is recommended to fit the slide metal fitting 70 through which the fastening bolt B1 is passed into the sliding guide groove 11d of the vertical bar 11 from below, then to place the solar photovoltaic power generation panels P and P on the vertical bar 11 so that the solar photovoltaic power generation panels P and P are adjoined by each other with a fastening bolt B1 therebetween, then to extend the presser metal fitting 80 fitted to the fastening bolt B1 between the rectangular frame bodies Pf and Pf of both adjoining solar photovoltaic power generation panels P and P, and to screw and tighten a nut N1 to the fastening bolt B1 from thereabove, and therefore it is possible to efficiently fix each solar photovoltaic power generation panel P through an easy operation. Additionally, the slide metal fitting 70 is movable along the sliding guide groove 11d in a not-screwed state or a loosened state of the nut N1 with respect to the fastening bolt B1, and therefore it is possible to positionally adjust each solar photovoltaic power generation panel P placed on the mount frame 1 with ease, and it is possible to set the entire arrangement of the solar photovoltaic power generation panels P with high accuracy by positioning each solar photovoltaic power generation panel P and then screwing and tightening the nut N1.

Each solar photovoltaic power generation panel P is firmly sandwiched between the presser metal fitting 80 and the vertical bar 11, and, on the side of the vertical bar 11, a sandwiching force acts by means of the slide metal fitting 70 fitted to the sliding guide groove 11d as shown in FIG. 12, and both upper edge portions 11a and 11a of the sliding guide groove 11d reach a state of being sandwiched and pressed between the rectangular frame body Pf of the solar photovoltaic power generation panel P and the slide metal fitting 70, and therefore the fixing strength of each solar photovoltaic power generation panel P becomes extremely great. Therefore, even if the great shock of an earthquake or the great wind pressure of a strong wind acts on the solar photovoltaic power generation panel P, a load applied to attachment portions with respect to the mount frame 1 is received by both upper edge portions 11a and 11a of the sliding guide groove 11d by means of the slide metal fitting 70, and there is, of course, no fear that the slide metal fitting 70 will be disengaged from the sliding guide groove 11d, and there is no concern that the fastening bolt B1 will be twisted and be cut or be bent.

Figure 15:
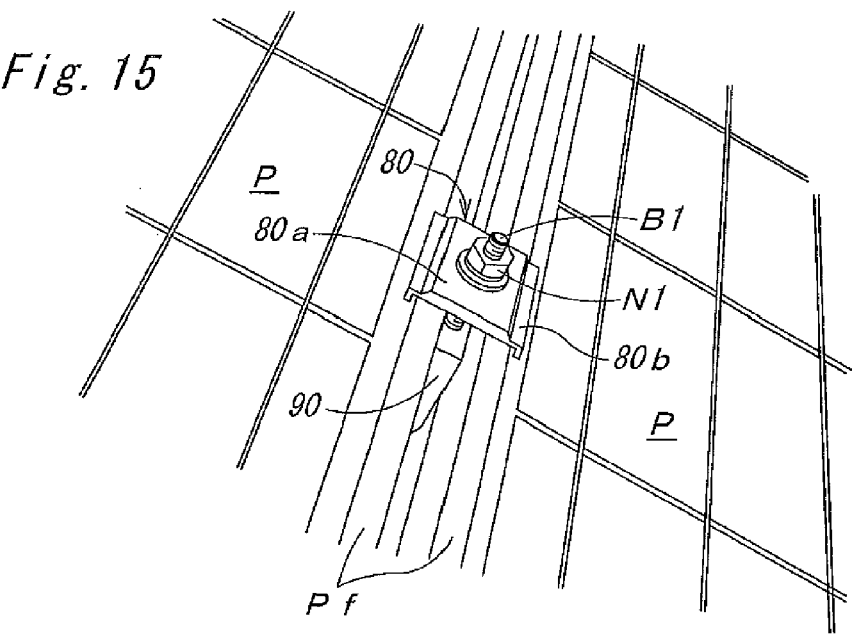
FIG. 15 is a perspective view showing an intermediate part of the mount frame to which the solar photovoltaic power generation panel has been attached.

On the other hand, as shown in FIG. 15, the solar photovoltaic power generation panel P is only sandwiched firmly between the presser metal fitting 80 and the vertical bar 11, and therefore the rectangular frame body Pf is not required to have each individual engagement structure, and the height of the presser metal fitting 80 is variable within a range in which a nut N1 is able to be screwed to a fastening bolt B1, and therefore, it is possible to cope with a difference in the up-down thickness of the solar photovoltaic power generation panel P within the variable range, and hence it is possible to obtain high general-purpose properties.

Additionally, particularly in the slide metal fitting 70 of the embodiment, the fastening bolt B1 is non-rotationally held between the leg pieces 70b and 70b in a state of being fitted in the sliding guide groove 11d of the vertical bar 11 as shown in FIG. 14A, and therefore, in installing the solar photovoltaic power generation panels P, it is only necessary to turn a nut N1 when the nut N1 is screwed and tightened to a fastening bolt B1, and an operation is easily performed, and the board portion 70a has a band-plate shape long in the sliding direction, and therefore the contact width of both upper edge portions 11a and 11a of the sliding guide groove 11d with respect to its back surface becomes large, and the fixing strength of the solar photovoltaic power generation panel P is correspondingly increased. In addition, the engagement strip portions 70c and 70c disposed on both sides in the width direction of the board portion 70a of the slide metal fitting 70 are engaged with the engagement groove portions 11e and 11e disposed on both sides of the sliding guide groove 11d of the vertical bar 11, and therefore the slide metal fitting 70 is prevented from becoming shaky in the sliding guide groove 11d, and, advantageously, the solar photovoltaic power generation panel P reaches a more rigidly installed state.

Additionally, it is possible to sandwich and position the spacer metal fitting 90 between the adjoining solar photovoltaic power generation panels P and P by fitting the spacer metal fitting 90 to the fastening bolt B1 as in the embodiment, and therefore it is possible to more easily perform the positional setting of each solar photovoltaic power generation panel P on the mount frame 1 with accuracy. Additionally, as illustrated in the embodiment, if an arrangement is created in which the spacer metal fitting 90 is formed to have the frame shape of an angular "U" opened downwardly, and is slid and fitted to the vertical bar 11 upwardly-inseparably in such a way that the engagement convex portion 90c formed on both side pieces 90b and 90b is engaged with the engagement groove 11f on both sides of the vertical bar 11, it is possible to slide and fit the spacer metal fitting 90 to the vertical bar 11 simultaneously with the fitting of the slide metal fitting 70 into the sliding guide groove 11d in a state in which the spacer metal fitting 90 has been beforehand fitted in the fastening bolt B1 passing through the slide metal fitting 70, and an operation is easily performed correspondingly, and the fitted height of the spacer metal fitting 90 in the fastening bolt B1 becomes constant, and the external appearance is improved.

On the other hand, as shown in FIG. 16, an arrangement is formed in which the stopper member 110 that prevents the fitted slide metal fitting 70 from falling off is fastened to the front end of the sliding guide groove 11d of the vertical bar 11 inclined so as to become forwardly lower, and therefore, when the solar photovoltaic power generation panels P are installed in the mount frame 1, while each slide metal fitting 70 is maintaining the not-screwed state or the loosened state of the nut N1 with respect to the fastening bolt B1, it is possible to efficiently arrange the plurality of solar photovoltaic power generation panels P in such a way as to place the solar photovoltaic power generation panels P to be arranged front and rear on the vertical bars 11 with the slide metal fitting 70 disposed at the front end and disposed therebetween successively from the front row side and as to forwardly move the solar photovoltaic power generation panels P in the front-rear direction while sliding the solar photovoltaic power generation panels P along the inclination of the vertical bar 11. Additionally, in both ends of the vertical bar 11, although the solar photovoltaic power generation panel P at its end position is firmly sandwiched between the end presser metal fitting 100 and the vertical bar 11, the end presser metal fitting 100 has the lateral cover portion 101 as in the embodiment, and, as a result, the fastening bolt B1 is laterally covered therewith, and therefore the external appearance becomes excellent as the entire solar photovoltaic power generation panel mount.

Advantageously, if the slide metal fitting 70 is made of a cut short member of an aluminum extrusion molding material, it is possible to easily set the slide metal fitting 70 to have great bending strength and a thick form, and it is possible to manufacture many slide metal fittings having the same shape and the same size at low cost from a long aluminum extrusion molding material. Additionally, if a hollow aluminum extrusion molding material is used for the vertical bar 11, the vertical bar 11 becomes light in weight and becomes high in strength, and, advantageously, even if it has a complex sectional shape having the sliding guide groove 11d, it is possible to massively produce it at low cost. This also applies to the horizontal bar 12. Additionally, advantageously, if the spacer metal fitting 90 is made of a cut short member of an aluminum extrusion molding material as in the embodiment, it is possible to manufacture many spacer metal fittings having the same shape and the same size at low cost.

In the solar photovoltaic power generation panel mount of the present invention, the upper-lower relationship between the vertical bar 11 and the horizontal bar 12 of the mount frame 1 may be opposite to that of the aforementioned embodiment. For example, when the solar photovoltaic power generation panels P are each long in the inclined front-rear direction, the number of solar photovoltaic power generation panels arranged in the inclined direction becomes small, and therefore it is recommended to form an arrangement in which the horizontal bars 12 the number of which is increased so that the respective panels P can be supported at a plurality of places are set on the upper side, and these horizontal bars 12 are received by the vertical bars 11 that are spaced correspondingly to the concrete foundations 4A and 4B, and the concrete foundations 4A and 4B are allowed to support it at the front and rear sides of each vertical bar 11. Additionally, in the present invention, it is possible to employ an arrangement in which a support pillar is also disposed on the lower front side of the inclined mount frame 1 and in which the lower end of the support pillar is supported and fixed to the concrete foundation 4A by means of the mounting bracket 5A in the same way as in the rear side. Therefore, if the front horizontal bar 12 is fixed directly to the mounting bracket 5A as in FIG. 4A, the lower front side is rigidly strongly supported and fixed to the concrete foundation 4A, and therefore, advantageously, even if the great shock of an earthquake or wind pressure is received, the mount is prevented from being collapsed, and damage or deformation is not easily caused, and no use of the support pillar on the front side makes it possible to reduce the number of members, and hence makes it possible to correspondingly facilitate an assembly operation, and makes it possible to reduce costs for the members.

Figure 17A:
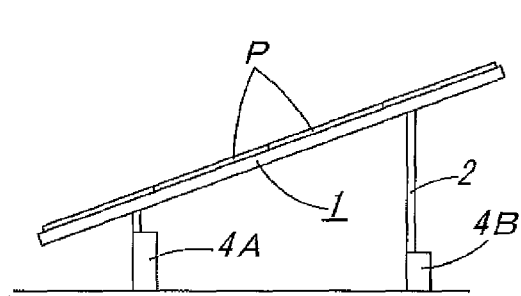
FIG. 17A and FIG. 17B illustrate the solar photovoltaic power generation panel mounts of the present invention that differ from each other in inclination angle, FIG. 17A being a side view of the panel mount having an inclination angle of 20°, FIG. 17B being a side view of the panel mount having an inclination angle of 30°.
Figure 17B:
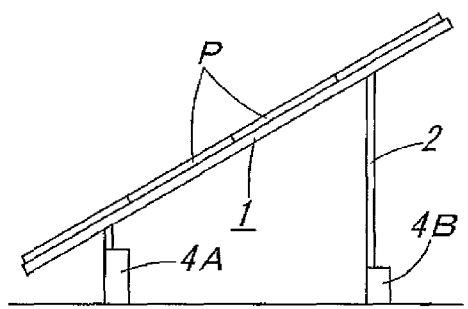

On the other hand, without being limited to 10° illustrated in the embodiment, the inclination angle of the mount frame 1 may be appropriately set in consideration of the surrounding situation of an installation place, the light-receiving efficiency depending on latitude, etc. For example, FIG. 17A shows the solar photovoltaic power generation panel mount that is set to have an inclination angle of 20°, and FIG. 17B shows the solar photovoltaic power generation panel mount that is set to have an inclination angle of 30°.

Figure 18A:
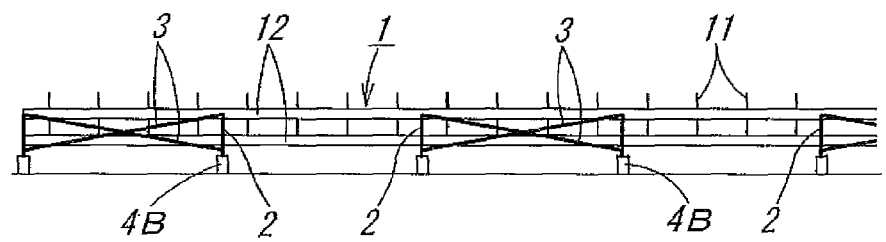
FIG. 18A and FIG. 18B each illustrate an arrangement in which braces are disposed in the solar photovoltaic power generation panel mount of the present invention, FIG. 18A being a back view of the panel mount having support-pillar spans the number of which is odd, FIG. 18B being a back view of the panel mount having support-pillar spans the number of which is even.
Figure 18B:
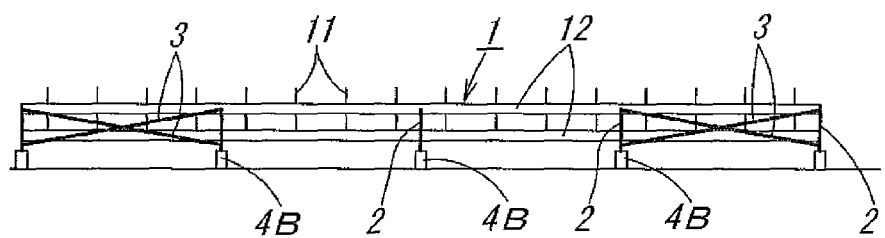

The brace 3 that is disposed between the rear support pillars 2 and 2 of the mount frame 1 may be disposed over the overall length in the right-left direction of the mount frame 1, and, in the mount frame 1 that has a right-left length of three spans or more when the distance between the adjoining support pillars 2 and 2 is defined as one span, it is recommended to dispose a pair of braces 3 and 3 that intersect with each other like the letter X with respect to every second span or every third span including spans of both right and left ends. For example, if the mount frame 1 is odd-number spans equal to three spans or more, it is recommended to provide X-shaped braces 3 and 3 to every second span including spans of both right and left ends as shown in FIG. 18A. Additionally, when the mount frame 1 has four spans, let it be supposed that two spans at the central side have no brace as shown in FIG. 18B. This makes it possible to secure great strength as a mount structure even if the number of braces 3 to be provided as a whole is decreased, and therefore, advantageously, costs for the members are reduced correspondingly, and the construction efficiency is greatly improved by reducing the number of processes for an attachment operation.

Additionally, in the present invention, it is possible to apply various design changes to detail arrangements, such as the sectional shape of the vertical bar 11, the sectional shape of the horizontal bar 12, the sectional shape of the support pillar 2, the sectional shape of the brace 3 of the mount frame 1, the shape of each of the concrete foundations 4A and 4B, the connection structure between the vertical bar 11 and the horizontal bar 12, the shape and the number of solar photovoltaic power generation panels P arranged along the inclined direction, etc., without being limited to the embodiment.

What is claimed is:

1. A solar photovoltaic power generation panel mount, wherein
solar photovoltaic power generation panels are attached onto a mount frame that is inclined so as to become forwardly lower and in which a plurality of vertical bars in a front-rear direction and a plurality of horizontal bars in a right-left direction are connected together in a grid manner,
foundations that project upwardly from a mount installation surface are disposed with a predetermined interval therebetween in the right-left direction under a front side and a rear side of the mount frame,
the mount frame is supported and fixed onto the foundations so as to be positionally adjustable in an up-down direction and in the right-left direction by means of mounting brackets fastened to tops, respectively, of the foundations,
a backwardly-wide sliding guide groove that is continuous in the longitudinal direction is formed in an upper surface of each of the plurality of vertical bars of the mount frame,
a slide metal fitting is fitted to the sliding guide groove so as to be slidable and so as to be upwardly inseparable, a fastening bolt that has been passed through the slide metal fitting from below protrudes upwardly, adjacent ones of the solar photovoltaic power generation panels placed on the plurality of vertical bars of the mount frames are allowed to adjoin each other with the fastening bolt therebetween, a presser metal fitting fitted to the fastening bolt is extended between rectangular frame bodies of the adjacent solar photovoltaic power generation panels, the adjacent solar photovoltaic power generation panels are sandwiched between the presser metal fitting and one of the plurality of vertical bars by tightening a nut that has been screwed to the fastening bolt from above the presser metal fitting, and a stopper member that prevents the slide metal fitting fitted in the sliding guide groove from falling off is fastened to a front end of the sliding guide groove of each of the plurality of vertical bars inclined so as to become forwardly lower.

2. The solar photovoltaic power generation panel mount according to claim 1, wherein the mounting brackets include a horizontal plate portion that has a hole elongated in the right-left direction and include vertical wall portions that have holes elongated in the up-down direction, an anchor bolt that protrudes from a top surface of the foundations is passed through the hole in the horizontal plate portion and is tightened and fastened with a nut, and a nut is tightened and fastened to an attachment bolt that has been passed through a supporting portion on a side of the mount frame through one of the holes in the vertical wall portion.

3. The solar photovoltaic power generation panel mount according to claim 1, wherein the each of the plurality of horizontal bars of the mount frame is set to have a length corresponding to a distance between adjacent support pillars, an end of each of the plurality of horizontal bars is connected to an upper-end lateral half part of a support pillar, and a yardarm member that has the same longitudinal sectional shape as the plurality of horizontal bars is fastened to an upper-end lateral half part not connected to one of the plurality of horizontal bars of support pillars positioned at both right and left ends of the mount frame.

4. The solar photovoltaic power generation panel mount according to claim 1, wherein, in the plurality of vertical bars and the plurality of horizontal bars of the mount frame, a backwardly-wide sliding guide groove that is continuous in a longitudinal direction is formed in an upper surface of each of the plurality of horizontal bars, a frame connection metal fitting is fitted to the sliding guide groove so as to be slidable and so as to be upwardly inseparable, whereas an engagement groove continuous in the longitudinal direction is formed in both sides of each of the plurality of vertical bars, the frame connection metal fitting has two parallel sandwiching wall portions that protrude upwardly along a direction perpendicular to a sliding direction with respect to the sliding guide groove, an engagement piece that protrudes inwardly is formed at each of the sandwiching wall portions, each engagement piece is engaged with an engagement groove of one of the plurality of vertical bars which is slid and fitted between the sandwiching wall portions of the frame connection metal fitting fitted in the sliding guide groove, and the frame connection metal fitting is fixed to one of the plurality of vertical bars, and one of the plurality of horizontal bars.

5. The solar photovoltaic power generation panel mount according to claim 4, wherein the frame connection metal fitting comprises a slide member that is fitted to the sliding guide groove and a receiving member that has the two parallel sandwiching wall portions and that allows the sandwiching wall portions to be disposed on the slide member, and side edges of the sliding guide groove are sandwiched between the slide member and the receiving member by a nut screwed and tightened to a fixing bolt passing through the slide member and through the receiving member.

6. The solar photovoltaic power generation panel mount according to claim 5, wherein the fixing bolt passes through a board portion of the receiving member and the slide member from below at positions outside both sandwiching wall portions of the receiving member, and a concave portion in which a head of the fixing bolt is contained is formed in a lower surface of the slide member.

7. The solar photovoltaic power generation panel mount according to claim 1, wherein the slide metal fitting has two parallel leg pieces erected on a lower surface side of a board portion that has a bolt through-hole and that is formed in a band-plate shape long in the sliding direction, and a head of the fastening bolt passing through the bolt through-hole is contained non-rotationally between both the leg pieces.

8. The solar photovoltaic power generation panel mount according to claim 7, wherein each of the plurality of vertical bars is made of a hollow aluminum extrusion molding material, the sliding guide groove is formed so as to be backwardly wide by engagement groove portions concaved in inner surfaces of both sides, and engagement strip portions that engage the engagement groove portions, respectively, are erected on both sides in a width direction of the board portion of the slide metal fitting.

9. The solar photovoltaic power generation panel mount according to claim 1, wherein a spacer metal fitting is fitted to the fastening bolt so as to be lower than the presser metal fitting, and positioning is performed by allowing the spacer metal fitting to be sandwiched between the adjacent solar photovoltaic power generation panels.

10. The solar photovoltaic power generation panel mount according to claim 9, wherein an engagement groove continuous in the longitudinal direction is formed in both sides of each of the plurality of vertical bars, the spacer metal fitting has a frame shape of an angular "U" opened downwardly forming two side pieces, an engagement convex portion that protrudes inwardly is formed on both side pieces of the spacer metal fitting, each engagement convex portion is engaged with one of the engagement grooves, and the spacer metal fitting is slid and fitted to the vertical bar upwardly-inseparably.

11. A solar photovoltaic power generation panel mount, wherein solar photovoltaic power generation panels are attached onto a mount frame that is inclined so as to become forwardly lower and in which a plurality of vertical bars in a front-rear direction and a plurality of horizontal bars in a right-left direction are connected together in a grid manner, foundations that project upwardly from a mount installation surface are disposed with a predetermined interval therebetween in the right-left direction under a front side and a rear side of the mount frame, the mount frame is supported and fixed onto the foundations so as to be positionally adjustable in an up-down direction and in the right-left direction by means of mounting brackets fastened to tops, respectively, of the foundations, a backwardly-wide sliding guide groove that is continuous in the longitudinal direction is formed in an upper surface of each of the plurality of vertical bars of the mount frame, a slide metal fitting is fitted to the sliding guide groove so as to be slidable and so as to be upwardly inseparable, a fastening bolt that has been passed through the slide metal fitting from below protrudes upwardly, adjacent ones of the solar photovoltaic power generation panels placed on the plurality of vertical bars of the mount frames are allowed to adjoin each other with the fastening bolt therebetween, a presser metal fitting fitted to the fastening bolt is extended between rectangular frame bodies of the adjacent solar photovoltaic power generation panels, the adjacent solar photovoltaic power generation panels are sandwiched between the presser metal fitting and one of the plurality of vertical bars by tightening a nut that has been screwed to the fastening bolt from above the presser metal fitting, in ends of each of the plurality of vertical bars, an end presser metal fitting for retaining a solar photovoltaic power generation panel placed at an end position is fitted to the fastening bolt passing through the slide metal fitting fitted to the sliding guide groove, a nut that has been screwed to the fastening bolt is tightened from above the end presser metal fitting, and, as a result, the solar photovoltaic power generation panel at the end position is sandwiched between the end presser metal fitting and one of the plurality of vertical bars, and the fastening bolt is laterally covered with a lateral cover portion contiguous to the end presser metal fitting.

* * * * *